US012705531B2

(12) United States Patent
Yi et al.

(10) Patent No.: US 12,705,531 B2
(45) Date of Patent: Aug. 11, 2026

(54) ELECTRONIC DEVICE FOR PERFORMING COMPUTATION BASED ON ARTIFICIAL INTELLIGENCE MODEL AND OPERATION METHOD THEREOF

(71) Applicant: SAMSUNG ELECTRONICS CO., LTD., Suwon-si (KR)

(72) Inventors: Hayoon Yi, Suwon-si (KR); Jaewoo Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1175 days.

(21) Appl. No.: 17/582,715

(22) Filed: Jan. 24, 2022

(65) Prior Publication Data

US 2022/0245515 A1 Aug. 4, 2022

Related U.S. Application Data

(63) Continuation of application No. PCT/KR2022/000803, filed on Jan. 17, 2022.

(30) Foreign Application Priority Data

Jan. 29, 2021 (KR) ........................ 10-2021-0013108
Apr. 27, 2021 (KR) ........................ 10-2021-0054594

(51) Int. Cl.
*G06N 20/00* (2019.01)
*G06F 21/53* (2013.01)

(52) U.S. Cl.
CPC ............ *G06N 20/00* (2019.01); *G06F 21/53* (2013.01); *G06F 2221/2149* (2013.01)

(58) Field of Classification Search
CPC .... G06N 2/00; G06F 21/53; G06F 2221/2149
See application file for complete search history.

(56) References Cited

U.S. PATENT DOCUMENTS 10,657,293 B1 5/2020 Wei et al.
2013/0019111 A1 1/2013 Martin
(Continued)

FOREIGN PATENT DOCUMENTS

CN 107683625 A 2/2018
CN 110674528 A 1/2020
(Continued)

OTHER PUBLICATIONS

Communication dated Apr. 3, 2024 issued by the European Patent Office in European Application No. 22746132.4.
(Continued)

*Primary Examiner* — Sherrod L Keaton
(74) *Attorney, Agent, or Firm* — Sughrue Mion, PLLC

(57) ABSTRACT

According to various embodiments, an electronic device may be provided, the electronic device comprising a memory and at least one processor, wherein the at least one processor is configured to by applying a noise value to weight values of at least a part of a plurality of layers included in an artificial intelligence model stored in the electronic device, obtain the weight values to which the noise value is applied, when an event for executing the artificial intelligence model is identified, obtain, based on computation of data input to the at least a part of the plurality of layers, computation data by using the weight values to which the noise value is applied, and obtain output data, based on the obtained computation data and the applied noise value.

20 Claims, 19 Drawing Sheets

(56) References Cited

U.S. PATENT DOCUMENTS

| | | | |
|---|---|---|---|
| 2013/0219508 A1 | 8/2013 | Lee et al. | |
| 2016/0057619 A1 | 2/2016 | Lopez | |
| 2017/0055175 A1 | 2/2017 | Leroux et al. | |
| 2018/0129893 A1 | 5/2018 | Son et al. | |
| 2018/0268306 A1 | 9/2018 | Laine et al. | |
| 2018/0336479 A1 | 11/2018 | Guttmann | |
| 2019/0025813 A1 | 1/2019 | Cella et al. | |
| 2019/0197357 A1 | 6/2019 | Anderson et al. | |
| 2019/0205517 A1 | 7/2019 | Moulin et al. | |
| 2019/0251298 A1 | 8/2019 | Zhu et al. | |
| 2020/0074202 A1 | 3/2020 | Kim et al. | |
| 2020/0104701 A1 | 4/2020 | Lee et al. | |
| 2020/0293944 A1 | 9/2020 | Furukawa et al. | |
| 2020/0328876 A1 | 10/2020 | Gouget et al. | |
| 2020/0380374 A1* | 12/2020 | Foret | G06N 3/08 |
| 2021/0192360 A1* | 6/2021 | Bitauld | G06N 3/084 |

FOREIGN PATENT DOCUMENTS

| | | | |
|---|---|---|---|
| CN | 112182645 | A | 1/2020 |
| CN | 111814189 | A | 10/2020 |
| CN | 112132270 | A | 12/2020 |
| KR | 10-2020-0025200 | A | 3/2020 |
| WO | 2014/018575 | A2 | 1/2014 |
| WO | 2016/140548 | A1 | 9/2016 |
| WO | 2020122902 | A1 | 6/2020 |

OTHER PUBLICATIONS

Tramer et al., "Slalom: Fast, Verifiable and Private Execution of Neural Networks in Trusted Hardware", International Conference on Learning Representations, XP080888704, Jun. 8, 2018, pp. 1-15 (15 pages total).

Florian Tramér et al., "Slalom: Fast, Verifiable and Private Execution of Neural Networks in Trusted Hardware", ICLR 2019, arXiv:1806.03287v2, Feb. 27, 2019, 19 pages.

International Search Report (PCT/ISA/210) and Written Opinion (PCT/ISA/237) dated Apr. 27, 2022 issued by the International Searching Authority in International Application No. PCT/KR2022/000803.

He, Z., et al., "Parametric Noise Injection: Trainable Randomness to Improve Deep Neural Network Robustness Against Adversarial Attack", 2019 IEEE/CVF Conference on Computer Vision and Pattern Recognition (CVPR), pp. 588-597 (11 pages).

Adesuyi, T., et al., "A Neuron Noise-Injection Technique for Privacy Preserving Deep Neural Networks", Open Computer Science, vol. 10, Issue 1, 2020, pp. 137-152.

Communication dated Sep. 24, 2025 issued by the European Patent Office in European Patent Application No. 22746132.4.

Communication dated Dec. 23, 2025, issued by the State Intellectual Property Office of PR China in Chinese Application No. 202280008324.2.

Communication dated May 20, 2026, issued by the China National Intellectual Property Administration in Chinese Application No. 202280008324.2.

* cited by examiner

< Artificial intelligence model >

| w1-1 | ... | ... | ... |
|---|---|---|---|
| w2-1 | ... | ... | ... |
| w3-1 | ... | ... | ... |

< 1st weight matrix >

ELECTRONIC DEVICE FOR PERFORMING COMPUTATION BASED ON ARTIFICIAL INTELLIGENCE MODEL AND OPERATION METHOD THEREOF

CROSS-REFERENCE TO RELATED APPLICATIONS

This application is continuation of International Application No. PCT/KR2022/000803, filed on Jan. 17, 2022, which claims priority to Korean Patent Application No. 10-2021-0013108 filed on Jan. 29, 2021 and Korean Patent Application No. 10-2021-0054594 filed on Apr. 27, 2021 in the Korean Intellectual Property Office, the disclosures of which are herein incorporated by reference.

BACKGROUND

Field

The disclosure relates to an electronic device for optimizing an artificial intelligence model and an operation method thereof.

Description of Related Art

Portable digital communication devices have become one of necessary elements for modern people. Consumers desire to receive various high-quality services, by using the portable digital communication devices anytime and anywhere.

Recently, artificial intelligence models trained based on an artificial intelligence learning algorithm are stored in the portable digital communication devices, and various types of data acquired by using the artificial intelligence models trained by the portable digital communication devices are processed so that various high-quality services can be provided.

However, as a resource required to manage artificial intelligence models increases, a demand for technology of optimizing a computation process of artificial intelligence models increases to manage the artificial intelligence models in portable digital communication devices.

An electronic device may store multiple pre-trained artificial intelligence models (e.g., deep learning models or machine learning models). The pre-trained artificial intelligence models may include multiple layers, and may include at least one parameter (e.g., weight values, an activation function, and a bias) for computation of data input to each of the multiple layers. The electronic device may process data by using at least one parameter included in each of artificial intelligence models, based on execution of the artificial intelligence models, so as to provide various types of services to a user. However, when the artificial intelligence models are stored in and executed by the electronic device, there is a possibility that information on the artificial intelligence models is exposed to the outside, which may cause a problem in security. In addition, for security enhancement, when the artificial intelligence models are stored and executed in a secured area in the electronic device, a problem in computation performance may occur due to a lack of computation devices assigned to the secured area.

According to various embodiments, an electronic device and an operation method thereof may allow pre-trained artificial intelligence models to be stored and executed in a secured environment, thereby enhancing the security of the artificial intelligence models stored in the electronic device.

In addition, according to various embodiments, when at least partial computation (e.g., computation based on at least some layers) based on artificial intelligence models stored in a secured environment is performed, the electronic device and the operation method thereof may use computation devices assigned in a normal environment and prevent values for computation from being exposed to the outside (e.g., apply a noise value), thereby enhancing the computation performance and maintaining enhanced security.

SUMMARY

According to various embodiments, an electronic device may be provided, the electronic device including a memory and at least one processor, wherein the at least one processor is configured to by applying a noise value to weight values of at least a part of a plurality of layers included in an artificial intelligence model stored in the electronic device, obtain the weight values to which the noise value is applied, when an event for executing the artificial intelligence model is identified, obtain, based on computation of data input to the at least a part of the plurality of layers, computation data by using the weight values to which the noise value is applied, and obtain output data, based on the obtained computation data and the applied noise value.

According to various embodiments, an operation method of an electronic device may be provided, the method including by applying a noise value to weight values of at least a part of a plurality of layers included in an artificial intelligence model stored in the electronic device, obtain the weight values to which the noise value is applied, when an event for executing the artificial intelligence model is identified, obtaining, based on computation of data input to the at least a part of the plurality of layers, computation data by using the weight values to which the noise value is applied, and obtaining output data, based on the obtained computation data and the applied noise value.

According to various embodiments, an electronic device may be provided, the electronic device including a memory and at least one processor, wherein the at least one processor is configured to by applying a noise value to weight values of at least a part of a plurality of layers included in an artificial intelligence model stored in the electronic device, obtain the weight values to which the noise value is applied, in a trusted execution environment, when an event for executing the artificial intelligence model is identified, obtain, based on computation of data input to the at least a part of the plurality of layers, computation data by using the weight values to which the noise value is applied, in a rich execution environment, change, based on the acquisition of the computation data, a state of the electronic device from the rich execution environment to the trusted execution environment, and obtain, based on the obtained computation data and the applied noise value, output data in the trusted execution environment.

Technical solutions according to various embodiments are not limited to the above-described solutions, and other solutions, which are not mentioned, may be clearly understood from the specification and the accompanying drawings by those skilled in the art to which the disclosure belongs.

According to various embodiments, an electronic device and an operation method thereof may be provided, wherein the electronic device and the operation method thereof may store and execute pre-stored artificial intelligence models in a secured environment, thereby enhancing security of artificial intelligence models stored in the electronic device.

In addition, according to various embodiments, when at least partial computation (e.g., computation based on at least some layers) based on artificial intelligence models stored in a secured environment is performed, the electronic device and the operation method thereof may use computation devices assigned in a normal environment and prevent values for computation from being exposed to the outside (e.g., apply a noise value), thereby enhancing the computation performance and maintaining enhanced security.

DETAILED DESCRIPTION

Figure 1:
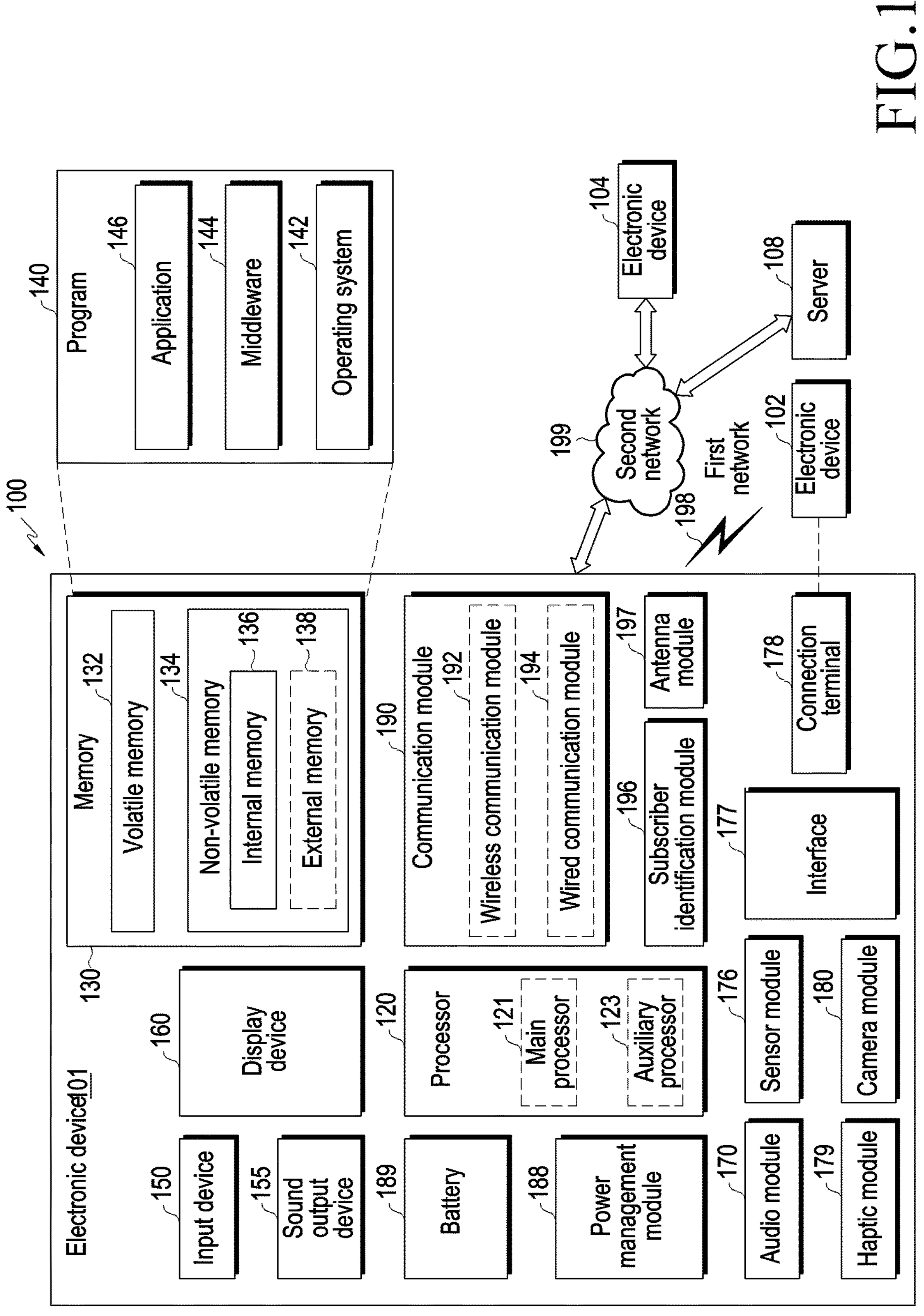
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC) of high-capacity data. The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transmit an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device 101 according to various embodiments may be one of various types of electronic devices. The electronic devices 101 may include, for example, a portable communication device (e.g., a smartphone), a computer device, a portable multimedia device, a portable medical device, a camera, an electronic device, or a home appliance. According to an embodiment of the disclosure, the electronic device 101 is not limited to the examples described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the invoked at least one instruction. This allows the machine to be operated to perform at least one function according to the at least one instruction invoked. The one or more instructions may include a code generated by a complier or a code executable by an interpreter. The machine-readable storage medium may be provided in the form of a non-transitory storage medium. While the term "non-transitory" simply means that the storage medium is a tangible device, and does not include a signal (e.g., an electromagnetic wave) only, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an example of a configuration of an electronic device (e.g., the electronic device 101 of FIG. 1) according to various embodiments is described. The electronic device in the following description may be implemented as shown in the above-described electronic device 101 of FIG. 1, and thus, a redundant description will be omitted.

Figure 2:
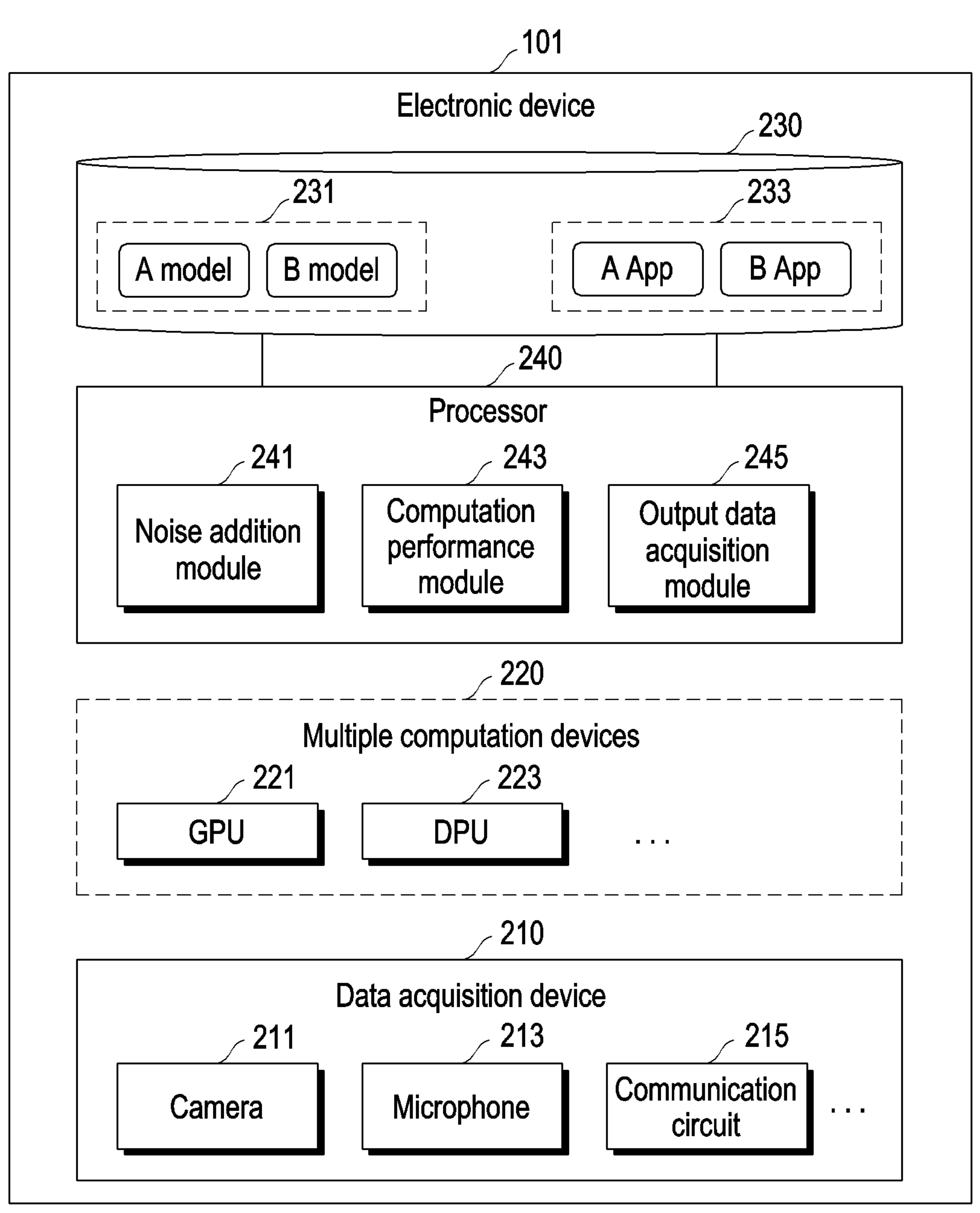
FIG. 2 illustrates an example of a configuration of an electronic device according to various embodiments.

FIG. 2 illustrates an example of a configuration of an electronic device 101 according to various embodiments. However, the disclosure is not limited to the elements illustrated in FIG. 2, and the electronic device 101 may be implemented to include more or fewer elements than the elements illustrated in FIG. 2. Hereinafter, FIG. 2 is described with reference to FIGS. 3A to 3C and FIGS. 4A and 4B.

Figure 3A:
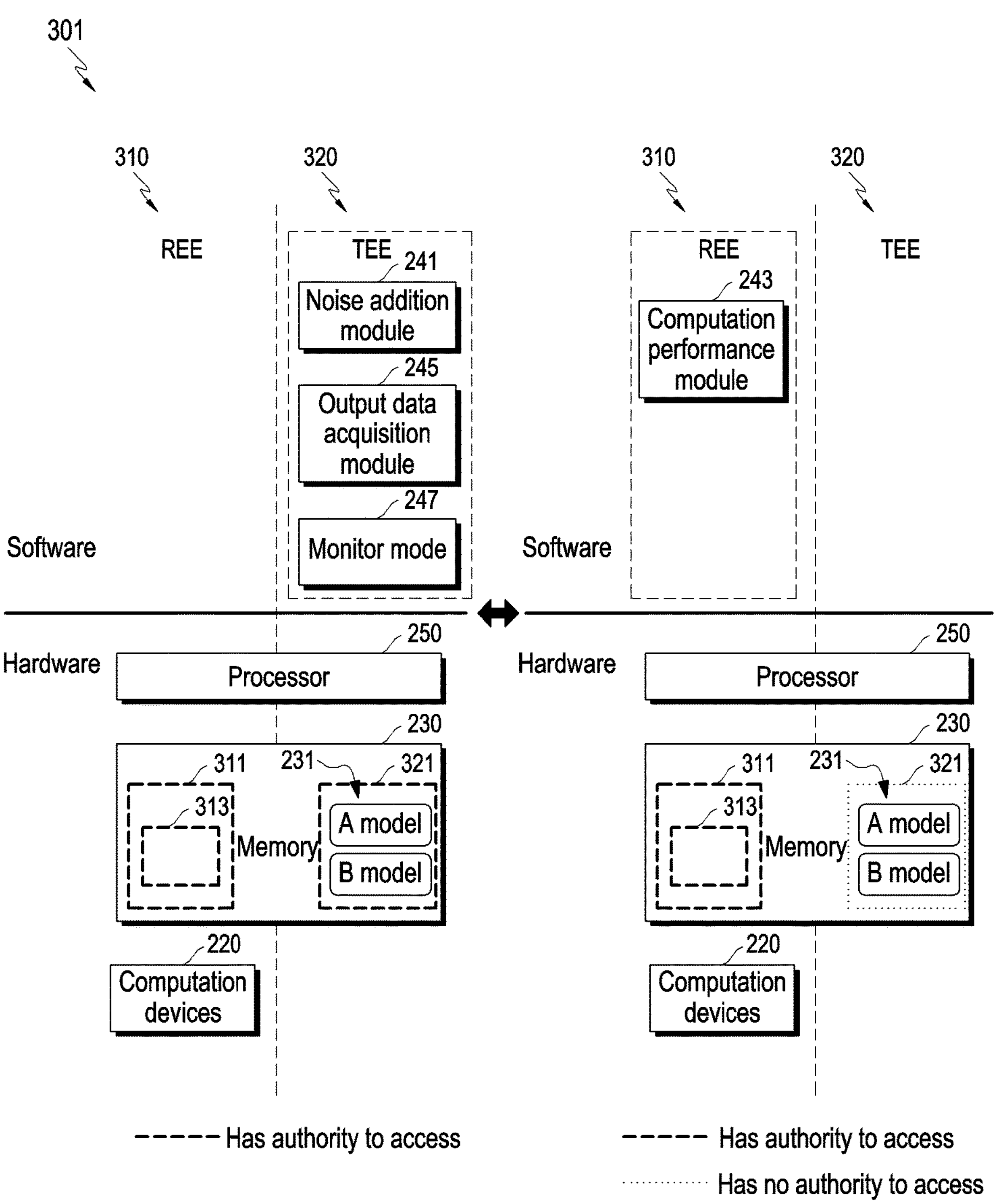
FIG. 3A illustrates an example of an execution environment of an electronic device including a single processor according to various embodiments.
Figure 3B:
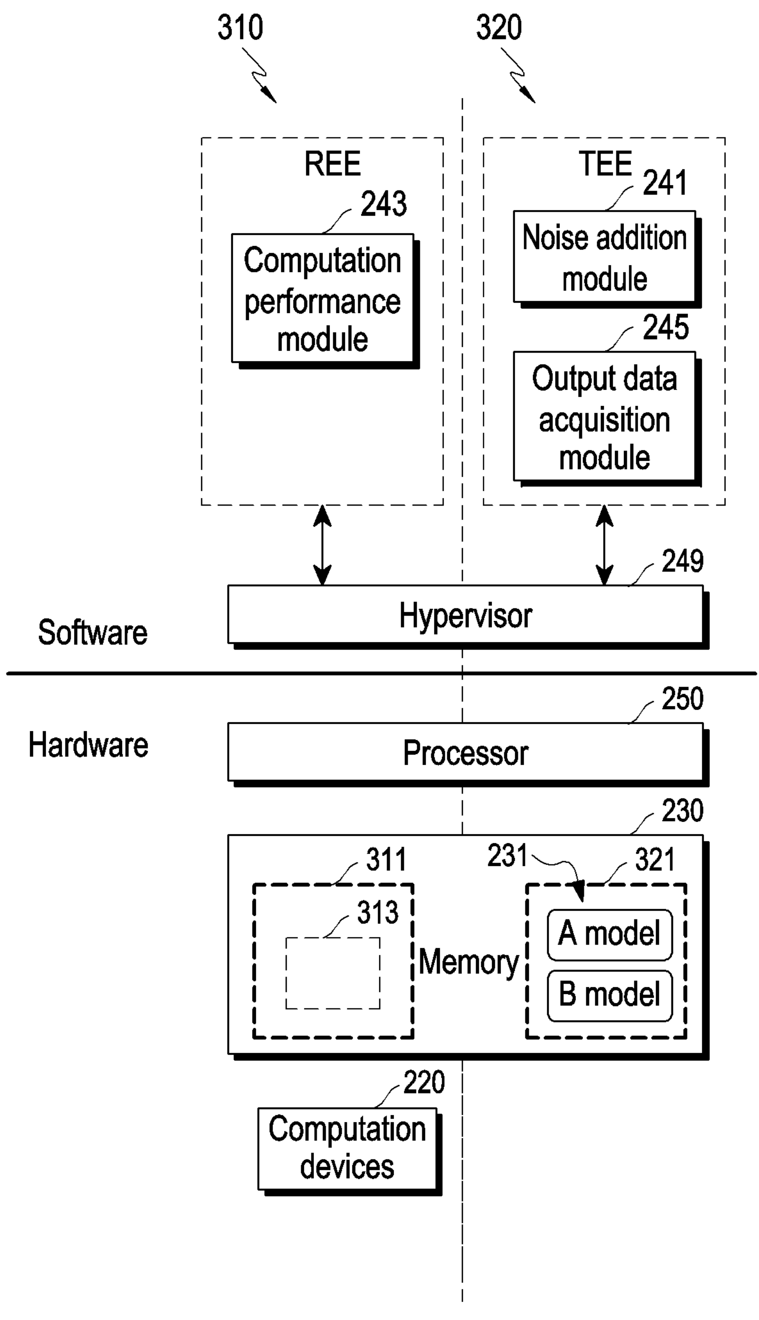
FIG. 3B illustrates another example of an execution environment of an electronic device including a single processor according to various embodiments.
Figure 3C:
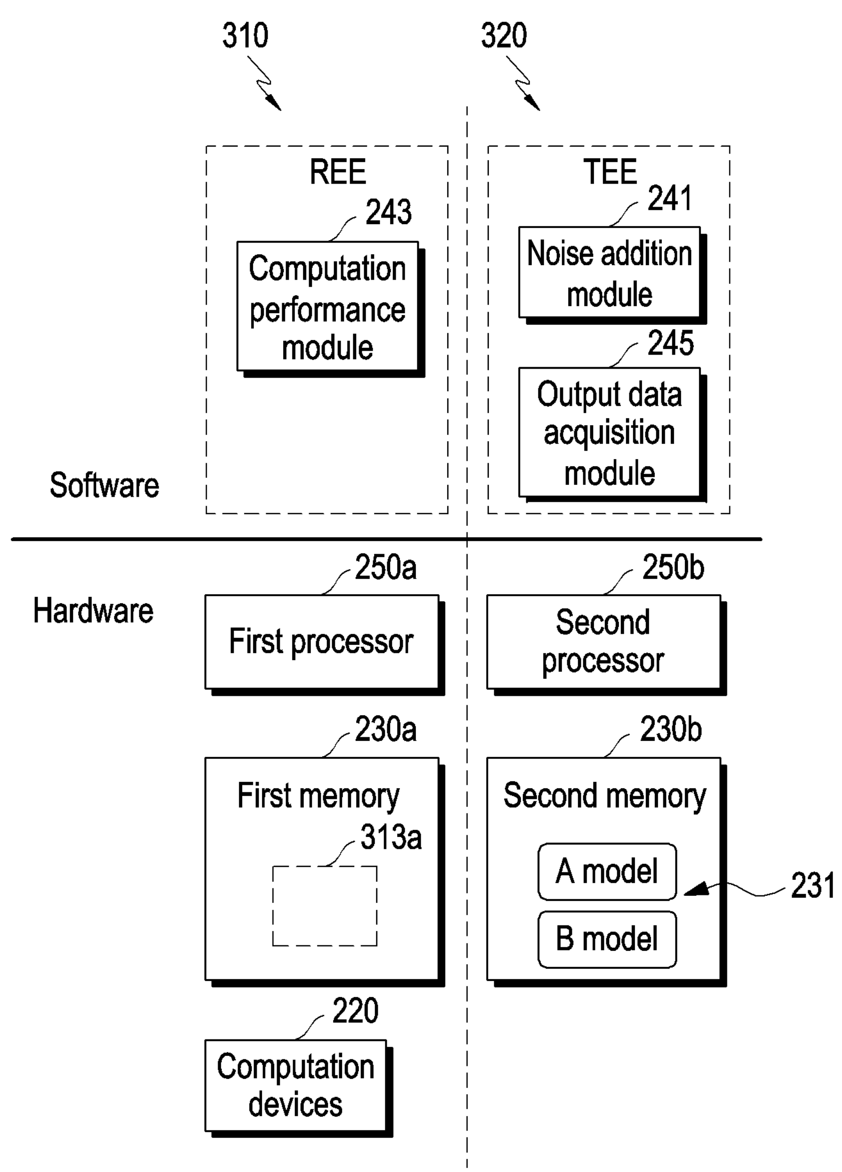
FIG. 3C illustrates an example of an execution environment of an electronic device including multiple processors according to various embodiments.
Figure 4A:
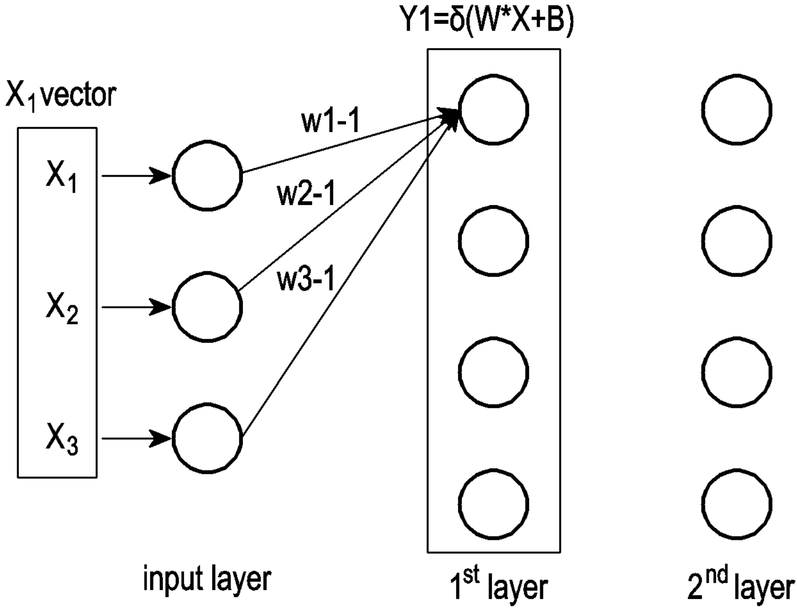
FIG. 4A illustrates an example of an artificial neural network according to various embodiments.
Figure 4B:
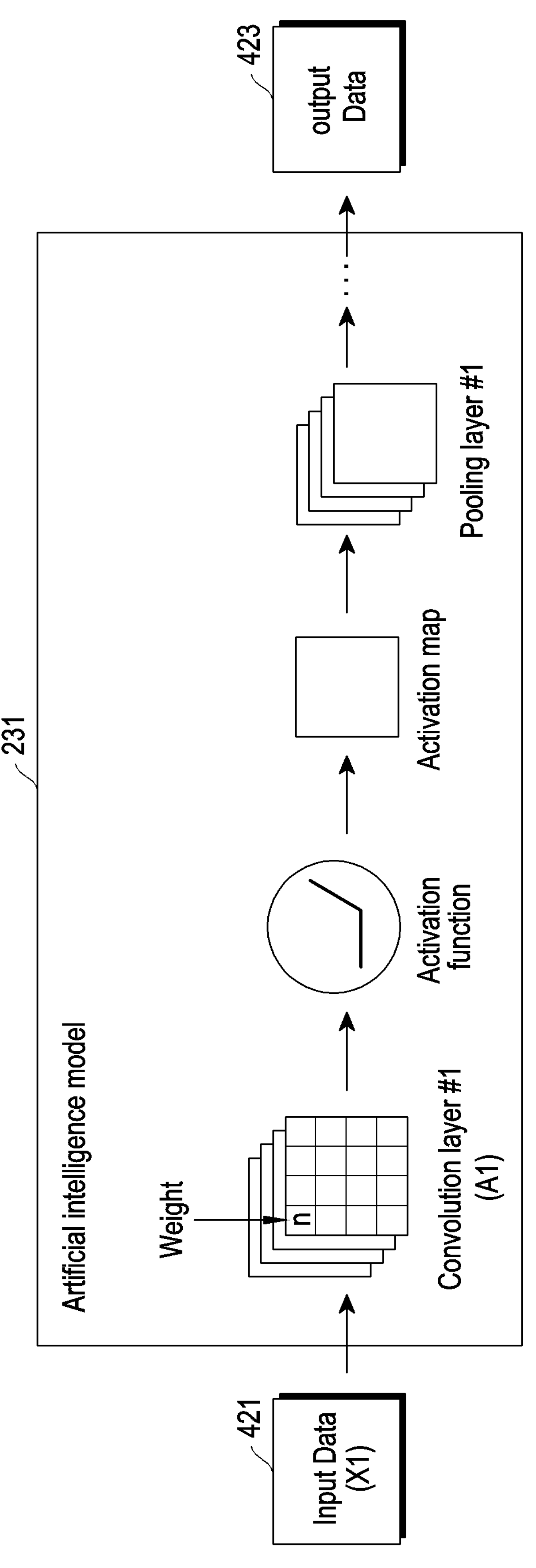
FIG. 4B illustrates another example of an artificial neural network according to various embodiments.

FIG. 3A illustrates an example of an execution environment of an electronic device 101 including a single processor 250 according to various embodiments. FIG. 3B illustrates another example of an execution environment of an electronic device 101 including a single processor 250 according to various embodiments. FIG. 3C illustrates an example of an execution environment of an electronic device 101 including a plurality of processors (e.g., a first processor 250*a* and a second processor 250*b*) according to various embodiments. In FIGS. 3A to 3C, left and right sides divided with reference to a dotted line may include different execution environments (e.g., a rich execution environment (REE) 310 and a trusted execution environment (TEE)), respectively. FIG. 4A illustrates an example of an artificial neural network according to various embodiments. FIG. 4B illustrates another example of an artificial neural network according to various embodiments.

According to various embodiments, referring to FIG. 2, the electronic device 101 may include a data acquisition device 210 including a camera 211, a microphone 213, and a communication circuit 215, a plurality of computation devices 220, a memory 230 for storing a plurality of artificial intelligence models 231, a plurality of applications 233, and modules 240 (e.g., a noise addition module 241, a computation performance module 243, and an output data acquisition module 245), and a processor 250. Hereinafter, each element included in the electronic device 101 is described.

The data acquisition device 210 according to various embodiments is described below. The data acquisition device 210 may be understood as a logical concept for classifying devices for acquiring a content, from among devices included in the electronic device 101. The data acquisition devices 210 may further include various types of devices (e.g., various types of sensors and a touch screen)

for acquiring various types of contents described below, in addition to the camera 211, the microphone 213, and the communication circuit 215.

According to various embodiments, the data acquisition device 210 may acquire various types of data (or contents) to be processed based on the artificial intelligence models 231 to be described below. The various types of data may include an electronic document and media data such as an image, a video, and audio data, and the disclosure is not limited thereto, and may further include various types of electronic data (e.g., software and values of a sensor) which may be electronically analyzed by an artificial intelligence model. According to an embodiment, the data acquisition devices 210 are driven by execution and/or driving of applications, programs, and/or processes installed (or stored) in the electronic device 101, so as to acquire various types of data. For example, when a camera application is executed and/or driven, the electronic device 101 may drive the camera 211 (e.g., perform an operation of controlling readout of an image sensor) to acquire an image and/or a video as data. In another example, when a recording application is executed and/or driven, the electronic device 101 may drive the microphone 213 to acquire audio data such as surrounding sounds and/or a user's utterance as data. In another example, when a web-based application is executed and/or driven, the electronic device 101 may configure a communication connection with a media server by using the communication circuit 215 and acquire media data such as an image, a video, and audio data. Hereinafter, an example of each of the data acquisition devices 210 is described.

According to various embodiments, the camera 211 may capture a still image (or an image) or a moving image. According to an embodiment, at least one camera 211 may include one or more lenses, image sensors, image signal processors, or flashes. According to an embodiment, the electronic device 101 may include cameras 211 having different attributes or functions (or purposes). For example, the at least one camera 211 may include cameras having different angles. For example, the angles may include a 114-degree to 94-degree super-wide angle, a wide angle, a 84-degree to 63-degree normal lens, a 28-degree to 8-degree telephoto, and a 6-degree to 3-degree super-telephoto. In another example, the at least one camera 211 may include at least one front camera disposed on the front surface of the electronic device 101 and capturing an image and/or shooting a video, and at least one rear camera disposed on the rear surface of the electronic device 101 and capturing an image and/or shooting a video.

According to various embodiments, the microphone 213 may receive a sound from the outside of the electronic device 101. For example, the electronic device 101 (e.g., the processor 250) may drive the microphone 213 to receive a sound generated from the outside, through the microphone 213. The sound generated from the outside may include voices (or utterances) of speakers (e.g., users and/or another speaker (or other person)), residential noise, and ambient (background) noise. According to an embodiment, the microphone 213 may include a plurality of microphones 213. The electronic device 101 (e.g., the processor 250) may form beamforming for receiving a sound generate in a designated direction from the electronic device 101, from a sound received using the plurality of microphones 213. The acquired sound in the designated direction may be defined as a sub sound, based on the received sound. The plurality of microphones 213 may be arranged in the electronic device 101 to be spaced apart from each other by a predetermined distance, and may perform signal-processing of a sound received through each microphone 213, by the spaced distance and the phase or time associated with the direction in which the sound is to be acquired, so as to acquire the sub sound. The beamforming technology is known in the art, and thus, detailed description will be omitted.

According to various embodiments, the communication circuit 215 may form a communication connection with an external electronic device (e.g., another electronic device or a server) according to various types of communication schemes, and transmit and/or receive data. As described above, the communication schemes may be performed by a communication scheme in which a direct communication connection such as Bluetooth and Wi-Fi direct is configured, but the disclosure is not limited thereto, and may include a communication scheme (e.g., Wi-Fi communication) using an access point (AP) or a communication scheme (e.g., 3G, 4G/LTE, and 5G) using cellular communication using a base station. The communication circuit 215 may be implemented as the above-described communication module 190 of FIG. 1, and thus, a redundant description will be omitted.

Hereinafter, a plurality of computation devices 220 are described.

According to various embodiments, each of the plurality of computation devices 220 may be configured to perform computation (e.g., matrix computation (e.g., matrix multiplication)) based on (or associated with) the artificial intelligence models 231 stored in the electronic device 101. For example, the plurality of computation devices 220 may include, but are not limited to, at least one of an application processor (AP) (not shown), a central processing unit (CPU) (not shown), a graphics processing unit (GPU) 221, a display processing unit (DPU) 223, or a neural processing unit (NPU) (not shown), and may include various types of processors for computation. In the specification, a plurality of cores included in a processor may be understood as processors 250. For example, when a digital signal processor (DSP) is implemented to include a plurality of cores, each of the plurality of cores may be understood as a processor 250. The computation associated with the artificial intelligence model may include computation (e.g., matrix computation, bias computation, and activation function computation) based on the artificial intelligence models 231 including layers trained in advance. Although described below, each of the plurality of computation devices 220 may be configured to perform computation in a specific execution environment (e.g., a rich execution environment (REE) 310 or a trusted execution environment (TEE) 320) (or an execution mode or a processor 250). For example, the rich execution environment (REE) may refer to a general execution environment having a low security level, and the trusted execution environment (TEE) may refer to a security execution environment having a high security level. The security execution environment may, for example, store data requiring a relatively high security level in a secure environment, and perform related operations. The trusted execution environment may operate in a security domain, for example, by dividing an application processor or a memory into a general domain and a security domain and software or hardware requiring security may be operated only in a security area. For example, most of the plurality of computation devices 220 may be configured to perform computation based on an artificial intelligence model in the rich execution environment 310, and the rest of the plurality of computation devices 220 may be configured to perform computation in the trusted execution environment 320. An operation of performing computation based on the artificial intelligence model of the plurality of computation devices 220 may be performed in the background, but is not limited to be performed in the background and may be also performed in the foreground.

According to various embodiments, a value associated with computation ability usable by each of the plurality of computation devices 220 may be preset. For example, values associated with the computation ability may include, but are not limited to, a 32-bit value, a 16-bit value, a 8-bit value, and a 4-bit value, and may be configured with various values, and a range of numbers and types for computation may be determined according to the configured value. For example, when a computation value for a computation device is configured with a 32-bit value, the computation device may compute weights included in the artificial intelligence model 231 in units of floating points (32-bit float) having a 8-bit exponent and a 24-bit mantissa. The range of types and numbers representable based on other computation values is known in the art, and thus, detailed description will be omitted.

Hereinafter, the artificial intelligence model 231 according to various embodiments is described.

According to various embodiments, each of the plurality of artificial intelligence models 231, as an artificial intelligence model 231 for which training based on a designated type of a learning algorithm has been completed in advance, may be an artificial intelligence model pre-implemented to receive and compute various types of data (or contents) and output (or acquire) result data. For example, in the electronic device 101, learning is performed based on a machine learning algorithm or a deep learning algorithm to output a specific type of result data as output data by using a designated types of data as input data, and a plurality of artificial intelligence models 231 (e.g., a machine learning model and a deep learning model) are generated, so that the generated a plurality of artificial intelligence models 231 may be stored in the electronic device 101, or artificial intelligence models 231 for which training has been completed by an external electronic device (e.g., an external server) may be transmitted to and stored in the electronic device 101. According to an embodiment, when an artificial intelligence model is received (or downloaded) from the external server to the electronic device 101, the external server may correspond to a third-party server for manufacturing an application or a management server in which third parties generate an application, an artificial intelligence model corresponding to a function to be provided through the application may be registered in the external server together with the application. Accordingly, the application and the corresponding artificial intelligence model may be transmitted to (e.g., downloaded in) the electronic device 101 from the external server together, but the disclosure is not limited thereto. The machine learning algorithm may include, but are not limited to, supervised algorithms such as linear regression and logistic regression, unsupervised algorithms such as clustering, visualization and dimensionality reduction, and association rule learning, and reinforcement algorithms, and the deep learning algorithm may include an artificial neural network (ANN), a deep neural network (DNN), and a convolution neural network (CNN), and may further include various learning algorithms. According to an embodiment, each of the plurality of artificial intelligence models 231 may be configured to perform execution by using a specific computation device among the plurality of computation devices 220. Accordingly, computation based on each of the plurality of artificial intelligence models 231 may be performed (e.g., the weight is computed in the form of 32-bit float) based on a value associated with computation ability preconfigured to be used by a specific computation device. However, the disclosure is not limited thereto, and a computation device for executing each of the plurality of artificial intelligence models 231 may be randomly selected from among the plurality of computation devices 220.

According to various embodiments, the artificial intelligence model 231 for which the learning has been completed may include one or more parameters (e.g., at least one of weight values, an activation function, or a bias) for computing input data, and may acquire, based on the parameters, output data by computing the input data. For example, as shown in FIG. 4A, the artificial intelligence model 231 for which the learning has been completed may include a plurality of layers (e.g., a first layer ($1^{st}$ layer) and a second layer ($2^{nd}$ layer)), and may include, for each of the plurality of layers, at least one of weight values w1-1, w2-1, and w3-1 (or a weight matrix (W)), activations functions (e.g., a sigmoid function and a Relu function), or a bias (or a bias vector (B)) for computing input data (e.g., an $X_1$ vector) input for each of the plurality of layers. The layers (e.g., the first layer ($1^{st}$ layer) and the second layer ($2^{nd}$ layer)) may be understood as logical concepts stored by classifying values (e.g., weight values, an activation function, and a bias) for computation. For example, referring to FIG. 4A, the artificial intelligence model 231 may acquire, based on input of input data ($x_1$, $x_2$, and $x_3$) to the first layer ($1^{st}$ layer), output data (Y1) by multiplying each input data ($x_1$, $x_2$, or $x_3$) and a weight (e.g., w1-1, w2-1, or w3-1) configured for each of nodes of the first layer ($1^{st}$ layer), adding a bias (B) to each input data obtained by multiplying the weight, and applying an activation function (δ(x)) to the added result. Consequently, as shown in [Equation 1] below, with respect to the specific layer (e.g., the first layer ($1^{st}$ layer) of the artificial intelligence model 231, the electronic device 101 may perform matrix computation below, and values for computation may be stored as a weight matrix and a bias matrix for each of the layers.

$$Yn = \delta(Xn \times An - Bn) \quad \text{[Equation 1]}$$

In [Equation 1], n denotes an identifier (or sequence) of a layer, Xn denotes data input for each of layers, An denotes a weight matrix for each of the layers, Bn denotes a bias matrix for each of the layers, and δ denotes an activation function.

The output data (e.g., a Y1 matrix) output according to the computation in the layer (e.g., the first layer ($1^{st}$ layer)) may be input to the next layer (e.g., the second layer ($2^{nd}$ layer)), and the input data may be computed based on weight values, a bias, or an activation function of the second layer ($2^{nd}$ layer). Accordingly, sequential computation of the above-described layers of the artificial intelligence model may be continuously performed until computed result data is output in an output layer (not shown). The disclosure is not limited to the description or the illustration above, and the bias matrix and/or the activation function may not be implemented according to implementation purposes. In another example, as shown in FIG. 4B, when an artificial intelligence model is trained based on the CNN, the plurality of layers may include various types of layers such as a pooling layer and a convolution layer for computation of input data (e.g., $X_1$ 421) and acquisition of result data 423. The disclosure is not limited to the description above, the artificial intelligence model 231 may be implemented according to the technology known in the art, and thus, detailed description will be omitted.

Hereinafter, the processor 250 according to various embodiments is described. For convenience of description, the processor 250 below is described and/or illustrated to be distinguished from the above-described a plurality of computation devices 220, but the processor 250 may be one of the plurality of computation devices 220. However, the disclosure is not limited thereto, and the processor 250 may correspond to a processor 250 implemented separately from the plurality of computation devices 220.

According to various embodiments, the processor 250 may include at least one of an application processor (AP), a central processing unit (CPU), a graphics processing unit (GPU), a display processing unit (DPU), or a neural processing unit (NPU). An operation of the processor 250 described below may be performed according to execution of the modules 240 (e.g., the computation performance module 243, the noise addition module 241, and the output data acquisition module 245) stored in the memory 230. For example, at least a part of the modules 240 (e.g., the computation performance module 243, the noise addition module 241, and the output data acquisition module 245) may be implemented (for example, executed) by software, firmware, or a combination of two or more thereof. For example, the modules may be implemented in the form of a process, a routine, instructions, a computer code, a program, and an application which may be executed by the processor 250. Accordingly, when the modules 240 are executed by the processor 250, the modules 240 may cause the processor 250 to perform an operation associated with the modules (or a function which may be provided by the modules). Accordingly, hereinafter, when a specific module performs an operation, it may mean that the processor 250 performs the corresponding operation as the specific module is executed. Alternatively, the modules 240 may be implemented as a part of a specific application. Alternatively, the disclosure is not limited to the description and/or the illustration above, and each of the modules may be implemented as hardware (e.g., a processor or a control circuit) separately from the processor 250.

According to various embodiments, the processor 250 may perform an operation based on the modules executed in a plurality of execution environments which are spaced from each other. For example, execution environments that are spaced from each other in terms of software may be implemented, or execution environments that are spaced from each other in terms of hardware may be implemented. Hereinafter, examples of each of the execution environments are described.

Hereinafter, an example (e.g., FIGS. 3A and 3B) in which execution environments that are spaced in terms of software is described.

According to various embodiments, as shown in FIGS. 3A and 3B, the electronic device 101 may be implemented to perform an operation (or function) based on a plurality of execution environments that are separate (or independent) from each other in terms of software. The plurality of execution environments may include, but are not limited to, a rich execution environment (REE) 310 and a trusted execution environment (TEE) 320, and may further include various types of execution environments which may be implemented to be separated (or independent) from each other. In this case, the plurality of execution environments may be understood as a type of an execution mode of a single processor 250. For example, in a case of the electronic device 101 shown in FIG. 3A below, the processor 250 may perform an operation in the rich execution environment 310 for a first time interval, or may perform an operation in a trusted execution environment 320 for another second time interval. In this case, types of hardware and authorities assigned to each of the execution environments (e.g., the rich execution environment 310 and the trusted execution environment 320) may be different from each other. In an embodiment, there may be different numbers of computation devices assigned to each of the execution environments. Referring to FIGS. 3A and 3B, each drawing may indicate that, with reference to a dotted line, hardware devices positioned on the left side are assigned to the rich execution environment 310 (or driven in the rich execution environment 310), and hardware devices on the right side are assigned to the trusted execution environment 320 (or driven in the trusted execution environment 320). For example, referring to FIGS. 3A and 3B, more computation devices are assigned (or all computation devices are assigned) to the rich execution environment 310 compared to the trusted execution environment 320, and accordingly, the processor 250 may perform an operation based on a relatively more computation devices in the rich execution environment 310. In another embodiment, as shown in FIGS. 3A and 3B, a designated area of the memory 230 is assigned to each of the execution environments (e.g., the rich execution environment 310 and the trusted execution environment 320), wherein in the rich execution environment 310, the processor 250 may read and write data from and to a first area 311 in the memory, the first area 311 being assigned to the rich execution environment 310, and in the trusted execution environment 320, the processor 250 may read and write data from and to a second area 321 in the memory 230, the second area 321 being assigned to the trusted execution environment 320. In another embodiment, types of security and authorities assigned to execution environments may be different from each other. For example, the authority and security for the trusted execution environment 320 may be higher than the authority and security for the rich execution environment 310. For example, in the trusted execution environment 320, the processor 250 may access the first area 311 in the memory 230, the first area 311 being assigned to the rich execution environment 310, so as to read and write data therefrom and therein, but, in the rich execution environment 310, hardware or information (e.g., the second area 321 in the memory 230) assigned to the trusted execution environment 320 may be inaccessible. As shown in FIGS. 3A and 3B, the artificial intelligence models 231 may be stored in an area (e.g., the second area 321) in the memory 230 in the trusted execution environment 320, and thus, the processor 250 may not access the artificial intelligence models 231 in the rich execution environment 310. Accordingly, information on the artificial intelligence models 231 may not be exposed to the outside.

According to various embodiments, the processor 250 may perform an operation based on modules executed in different execution environments, respectively. For example, referring to FIGS. 3A and 3B, the computation performance module 243 may be configured to be executed in the rich execution environment 310, and the noise addition module 241 and the output data acquisition module 245 may be configured to be executed in the trusted execution environment 320. As described above, based on that the authority and security in the trusted execution environment 320 are relatively higher, the processor 250 may not access, in the rich execution environment 310, data acquired based on the output data acquisition module 245 and the noise addition module 241 executed in the trusted execution environment 320. However, the disclosure is not limited thereto, and the execution environment of each of the modules may be implemented in a different manner from the illustration and/or description above. In an embodiment, as shown in FIG. 3A, the processor 250 may execute modules in different execution environments, based on a configuration (e.g., a monitor mode 247) for switching the execution environment. For example, as shown in FIG. 3A, software and hardware of the electronic device 101 may be implemented based on an advanced RISC machine (ARM) architecture (arm architecture), and in this case, the rich execution environment 310 may be defined as a normal world (or normal execution environment), and the trusted execution environment 320 may be defined as a secure world (or secure execution environment). The monitor mode 247 may be executed in the secure world (e.g., the trusted execution environment 320), and may perform switching between worlds (or switching between execution environments) when a secure monitor call (SMC) command for performing switching between worlds (e.g., the normal world (e.g., the rich execution environment 310) and the secure world (e.g., the trusted execution environment 320)) is generated or an interrupt request (IRQ) or a fast interrupt request (FIQ) is generated. For example, as shown in FIG. 3A, when an event for initiating an operation based on the noise addition module 241 or the output data acquisition module 245 occurs, the processor 250 may switch (or change) a current execution environment to the trusted execution environment 320 through the monitor mode 247 to perform the operation based on the noise addition module 241 or the output data acquisition module 245 in the trusted execution environment 320. In another example, when an event for switching a current environment to the rich execution environment 310 through the monitor mode 247 and initiating an operation based on the computation performance module 243 occurs, the processor 250 may perform the operation based on the computation performance module 243 in the trusted execution environment 320. Although not shown, an operating system (OS) executed in each execution environment may be included in the electronic device 101, and each OS may be executed when switched to each execution environment. For example, the processor 250 may execute an OS of the rich execution environment 310 in the rich execution environment 310, and may execute an OS of the trusted execution environment 320 in the trusted execution environment 320. As shown in FIG. 3A, the processor 250 may perform an operation based on each execution environment for different time intervals (or at different time points) that are not overlapping each other (e.g., perform an operation in the trusted execution environment 320 and then perform an operation in the rich execution environment 310, or perform an operation in the rich execution environment 310 and then perform an operation in the trusted execution environment 320), but the disclosure is not limited to the description above, and operations may be simultaneously performed based on two execution environments. In another embodiment, as shown in FIG. 3B, the processor 250 may execute modules (e.g., the noise addition module 241, the computation performance module 243, and the output data acquisition module 245) on different virtual OSs executed in different execution environments (e.g., the rich execution environment 310 and the trusted execution environment 320), by using virtual OSs executed in different execution environments and a hypervisor 249 managed by the virtual OSs. As implemented in FIG. 3B, an operation of executing each of the modules 240 in each execution environment by the electronic device 101 may be performed in the same manner as the description in FIG. 3A, and thus, a redundant description will be omitted. In this case, the processor 250 may perform an operation based on each execution environment for different time intervals that are not overlapping each other, but the disclosure is not limited to the description above, and operations may be simultaneously performed based on two execution environments. Software and hardware of the electronic device 101 as shown in FIG. 3B may be implemented based on the Intel's architecture (e.g., SGX (software guard extension) architecture).

According to various embodiments, the processor 250 may share data through a part of an area (e.g., the first area 311) in the memory, the area being assigned to the rich execution environment 310. For example, in the trusted execution environment 320, the processor 250 may write data acquired based on at least a part (e.g., the noise addition module 241) of the modules 240 in a part of the first area 311 in the memory, the first area 311 being assigned to the rich execution environment 310, and in the rich execution environment 310, the processor 250 may read data written in the part of the first area 311 when an operation based on at least a part (e.g., the computation performance module 243) of the modules 240 is performed. In another example, in the rich execution environment 310, the processor 250 may write (or store) data acquired based on at least a part (e.g., the computation performance module 243) of the modules 240 in a part of the first area 311 in the memory 230, the first area being assigned to the rich execution environment 310, and in the trusted execution environment 320, the processor 250 may read (or acquire) data written in the part of the first area 311 when an operation based on at least a part (e.g., the output data acquisition module 245) of the modules 240 is performed. In this case, specific modules (e.g., the noise addition module 241, the computation performance module 243, and the output data acquisition module 245) may be preconfigured to refer to a part of the first area 311 in the memory 230. Alternatively, the disclosure is not limited to the description above, and data sharing between execution environments may be performed in a scheme in which data is transmitted from the trusted execution environment 320 to the rich execution environment 310, or data is transmitted from the rich execution environment 310 to the trusted execution environment 320.

Hereinafter, an example (e.g., FIG. 3C) in which execution environments are separated in terms of hardware is described.

According to various embodiments, as shown in FIG. 3C, the electronic device 101 may be implemented to perform an operation (or function) in a plurality of execution environments, based on hardware (e.g., memories 230 and computation devices) that are independently implemented from each other. For example, in the electronic device 101, different types of hardware (e.g., processors **250*a* and 250*b*, memories 230*a* and 230*b*, and computation devices 220) are assigned to execution environments (e.g., the rich execution environment 310 and the trusted execution environment 320), respectively, and different authorities may be assigned. For example, as shown in FIG. 3C, the first processor 250*a* may execute a separate and independent operating system in the rich execution environment 310, perform an operation based on the computation performance module 243 by using computation devices, and read and write data from and to the first memory 230*a*. In another example, in the trusted execution environment 320, the second processor 250*b*** may execute an independent operating system that is separate from the operating system in the rich execution environment 310, perform an operation based on the noise addition module 241 and the output data acquisition module 245, and read and write data from and to the second memory 230*b*. In this case, the second processor 250*b* may have an authority to access the first memory 230*a* in the trusted execution environment 320. Description of the authorities in the rich execution environment 310 and the trusted execution environment 320 is identical to the description in FIGS. 3A and 3B, and thus, a redundant description will be omitted. In this case, similar to the description above, the processors (e.g., the first processor 250*a* and the second processor 250*b*) may perform an operation in the respective execution environments for time intervals that are not overlapping each other, but the disclosure is not limited to the description above, and operations may be simultaneously performed based on two execution environments. In addition, as described above, each of the processors (e.g., the first processor 250*a* and the second processor 250*b*) may share data through a part of a specific area 313*a* in the first memory 230*a*, the specific area 313*a* being assigned to the rich execution environment 310, but the disclosure is not limited thereto, and data sharing between execution environments may be performed in a scheme in which different types of data are transmitted between the respective execution environments.

Hereinafter, an example of each of the modules 240 executed by the processor 250 according to various embodiments is described. As described above, the computation performance module 243 may be executed in the rich execution environment 310, and the noise addition module 241 and the output data acquisition module 245 may be executed in the trusted execution environment 320. The disclosure is not limited to the description above, and the modules 240 may be implemented to be executed in different execution environments, respectively. For example, the electronic device 101 may perform computation based on the first layer among a plurality of layers of the artificial intelligence model in the trusted execution environment 320 (i.e., the computation performance module 243 implemented to perform computation based on the first layer may be executed in the trusted execution environment 320), which will be described in detail below.

According to various embodiments, the noise addition module 241 may generate noise values (e.g., weight noise and input noise) associated with computation based on the artificial intelligence model 231. For example, the noise addition module 241 may identify some of a plurality of layers of the artificial intelligence model 231, and generate weights of the identified layers and weight values to be applied to data input to the identified layers. An operation of identifying some of the layers by the noise addition module 241 will be described in FIGS. 5 to 7. In an embodiment, the noise addition module 241 may generate a noise value (hereinafter, referred to as weight noise) to be applied to weight values (e.g., a weight matrix) of some of the plurality of layers included in the artificial intelligence model 231, and may apply the generated noise value to the weight values of some of the plurality of layers (e.g., multiply the generated noise value and the weight values of some of the plurality of layers). The value of the weight noise may be randomly generated, and the value may be randomly configured within a range from a value smaller than 0.9 or a value equal to or larger than 1.1. In this case, the value of the weight noise may be configured in proportion to computation ability (e.g., 32 bits or 8 bits) of a computation device used for execution of the artificial intelligence model 231. In another embodiment, the noise addition module 241 may generate noise values (e.g., a noise vector) (hereinafter, referred to as input noise) to be applied (e.g., added) to data input to a part of a plurality of layers included the artificial intelligence model 231. The input noise type and number may be determined according to the input data type and size (e.g., the number of vectors), and each value may be randomly generated within a range of values that the input data may have. As to be described below, the noise addition module 241 may perform an operation of generating and applying weight noise for some layers in advance and an operation of generating input noise, and may pre-store data (e.g., weight values of a layer to which weight noise is applied, weight noise, input noise, and a noise subtraction matrix to be described in FIGS. 5 to 7 below) acquired according to the performing of the operations. The disclosure is not limited to the description above, and the noise addition module 241 may generate a noise value to be applied to an activation function and/or a bias vector.

According to various embodiments, the computation performance module 243 may perform computation based on the artificial intelligence model 231. For example, the computation performance module 243 may perform computation (e.g., matrix multiplication) based on weight values (e.g., a weight matrix) of a layer of the artificial intelligence model 231, to which a noise value is applied by the noise addition module 241, and input data (e.g., an input data matrix) input to the layer to which noise values are applied, so as to acquire output data. The computation is not limited to the description above, and may include various types of computation other than the matrix multiplication.

According to various embodiments, the output data acquisition module 245 may acquire output data by subtracting noise values from output data acquired by the computation performance module 243. In addition, when there is a bias in a layer from which the output data is computed, the output data acquisition module 245 may add the bias to the acquired output data, and/or when there is an activation function in the layer, the output data acquisition module 245 may further perform computation of inputting the acquired output data to the activation function. In this case, to reduce a computation amount, the processor 250 may pre-obtain and pre-store, as one value (or one matrix), values (e.g., a sum of biases to be added and noise values to be subtracted) computed from output data acquired by the computation performance module 243 when computation is performed for each layer. For example, the processor 250 (e.g., the noise addition module 241) may pre-obtain and pre-store a noise subtraction matrix (Tn) to be described below. Thereafter, the output data acquisition module 245 may apply the pre-obtained noise subtraction matrix (Tn) to computation data acquired by the computation performance module 243, and subtract the weight noise, so as to acquire output data from which noise values are removed, with relatively smaller computation amounts.

Hereinafter, an embodiment of an operation of the electronic device 101 according to various embodiments is described.

According to various embodiments, the electronic device 101 may pre-generate noise values associated with computation based on at least a part of a plurality of layers of the artificial intelligence model 231 in the trusted execution environment 320. The electronic device 101 may apply the pre-generated noise value to weight values of the at least a part of the plurality of layers to store the same, and then perform computation based on the weight values to which the pre-stored noise value is applied in the rich execution environment 310 when the artificial intelligence model 231 is executed, so as to acquire computation data acquired based on the performance of the computation. The electronic device 101 may acquire output data by subtracting the noise value from the computation data acquired in the trusted execution environment 320, and may continuously perform an operation by using the acquired output data as input data of the next layer.

Figure 5A:
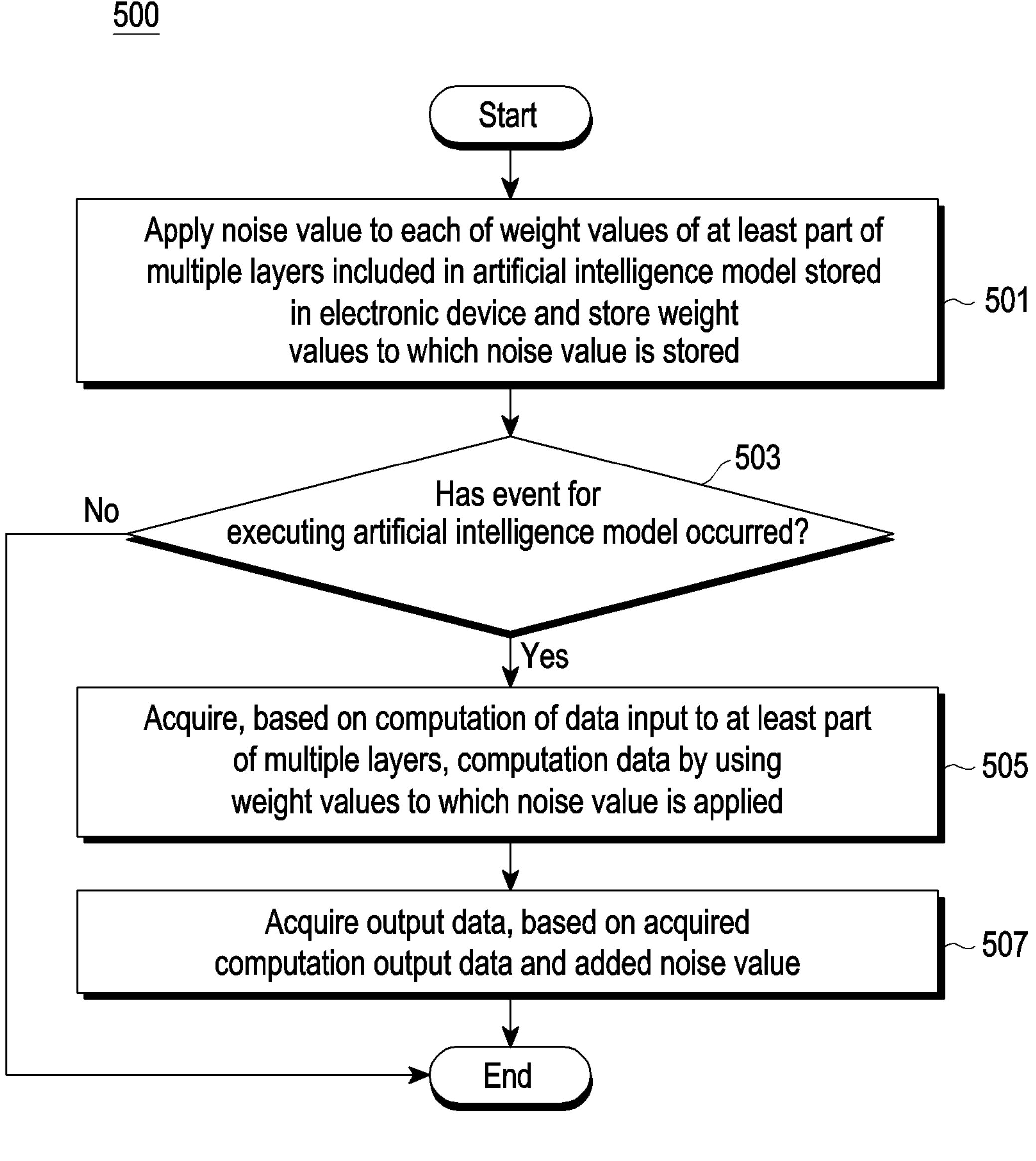
FIG. 5A is a flow chart illustrating an example of an operation of an electronic device according to various embodiments.

FIG. 5A is a flow chart 500 illustrating an example of an operation of an electronic device 101 according to various embodiments. The sequences of operations illustrated in FIG. 5A are not limited to the description above, and the operations may be performed according to various sequences. In addition, according to various embodiments, more or fewer operations may be performed than the operations illustrated in FIG. 5A. Hereinafter, FIG. 5A is described with reference to FIG. 5B, FIGS. 6A and 6B, and FIG. 7.

Figure 5B:
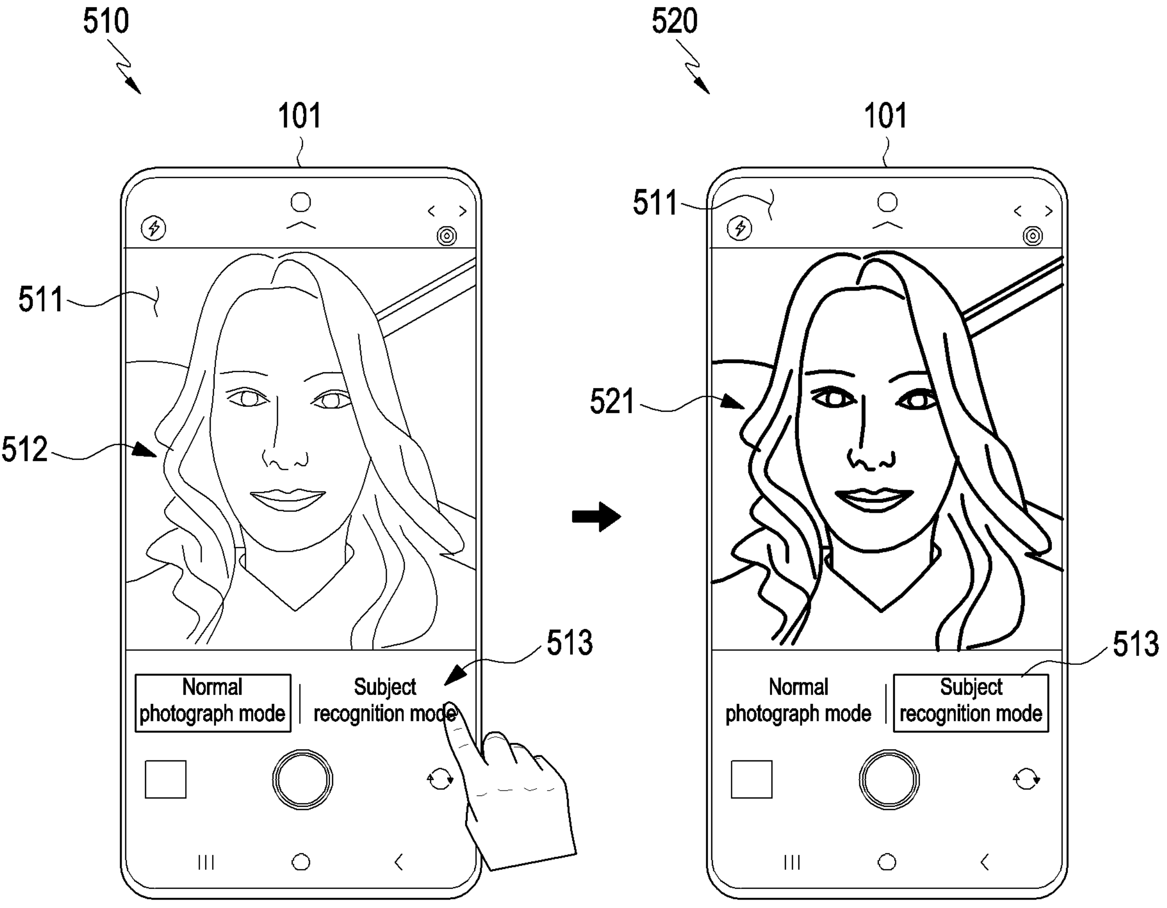
FIG. 5B illustrates an example of an operation of selecting an artificial intelligence model, based on execution of an application of an electronic device according to various embodiments.
Figure 6A:
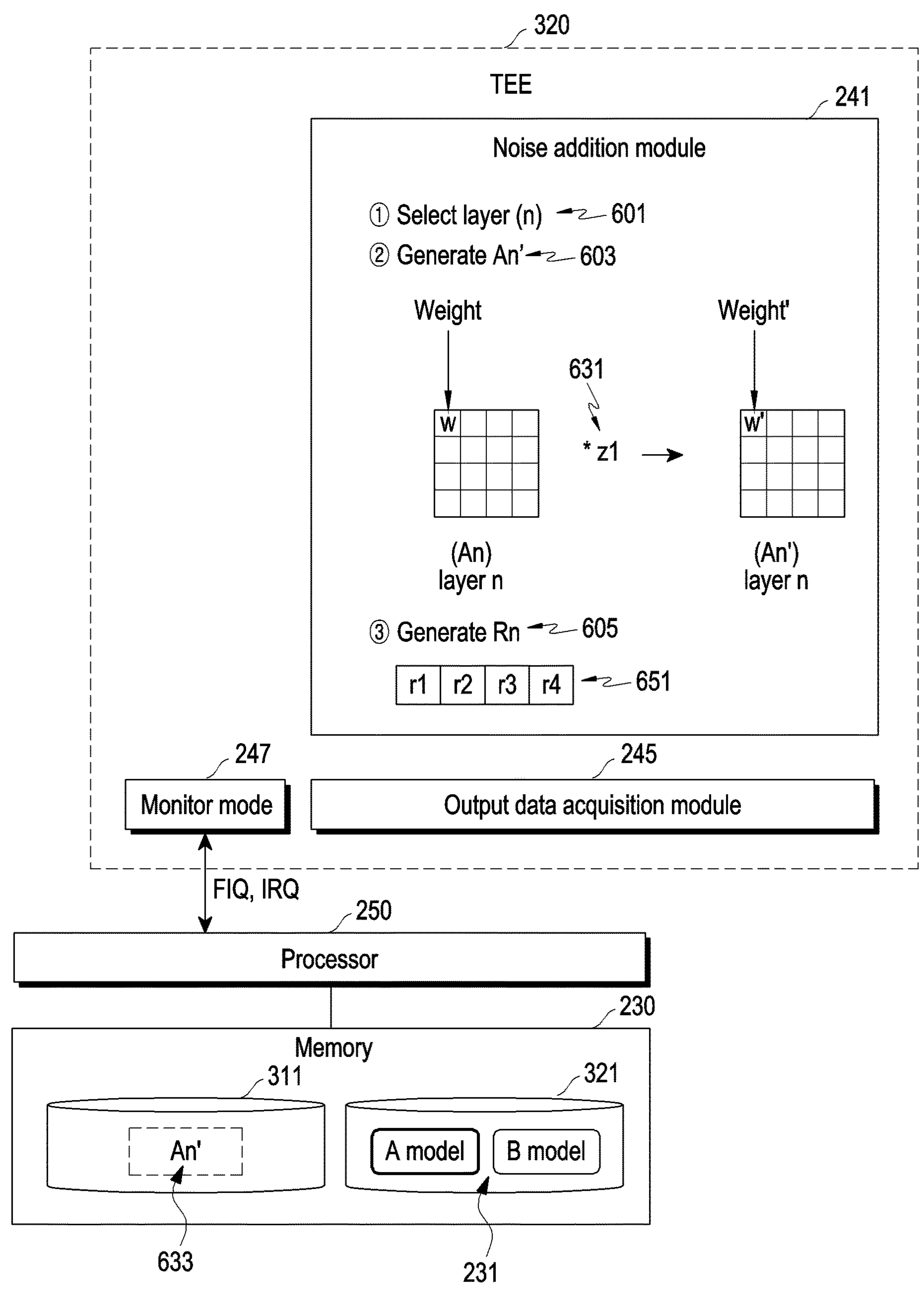
FIG. 6A illustrates an example of a pre-computation operation in a trusted execution environment of an electronic device according to various embodiments.
Figure 6B:
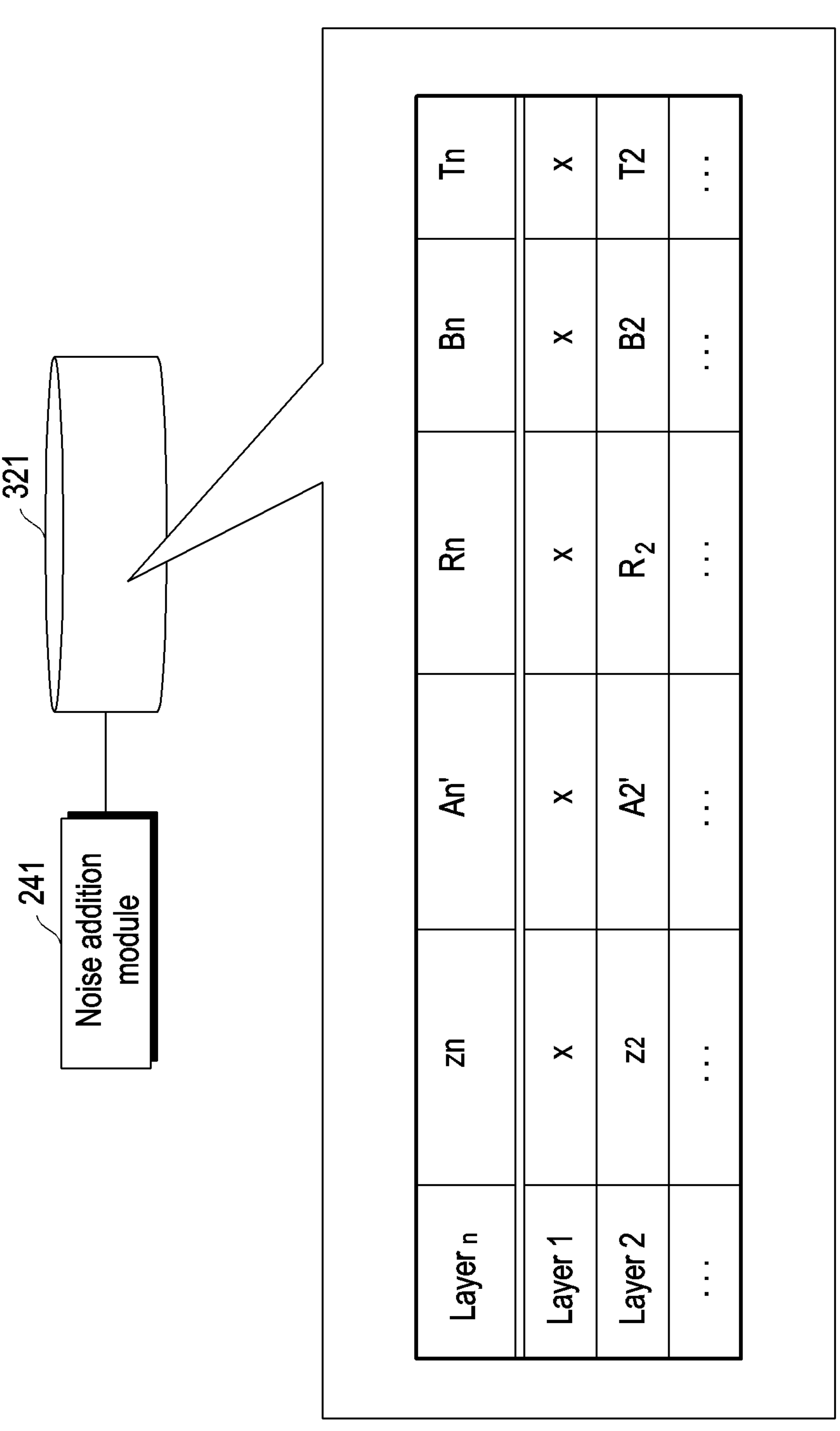
FIG. 6B illustrates an example of values stored in an electronic device according to a pre-computation operation according to various embodiments.
Figure 7:
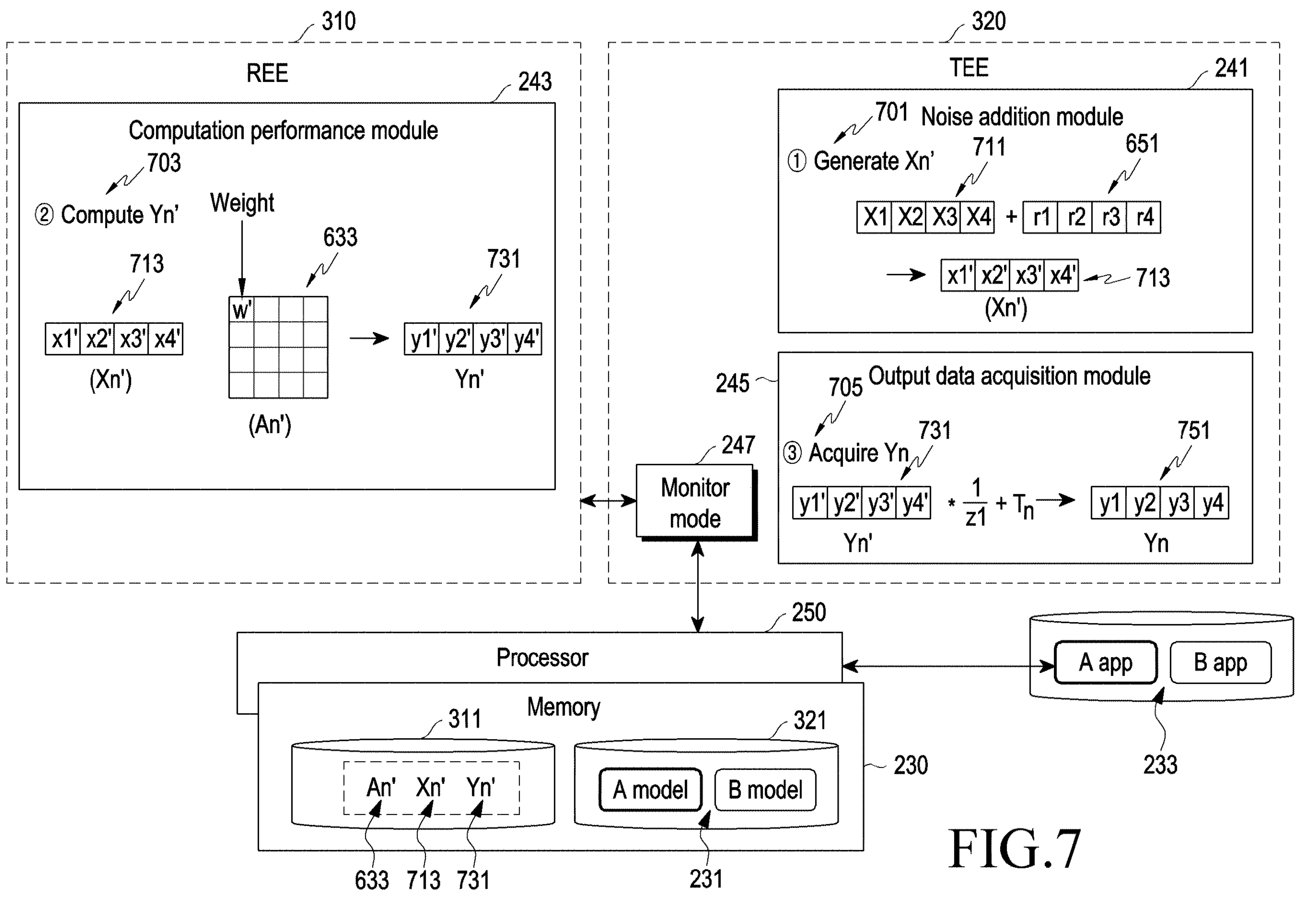
FIG. 7 illustrates an example of performing a computation operation based on an artificial intelligence model by using pre-computed values of an electronic device according to various embodiments.

FIG. 5B illustrates an example of an operation of selecting an artificial intelligence model, based on execution of an application of an electronic device 101 according to various embodiments. FIG. 6A illustrates an example of a pre-computation operation in a trusted execution environment of an electronic device 101 according to various embodiments. FIG. 6B illustrates an example of values stored in an electronic device 101 according to a pre-computation operation according to various embodiments. FIG. 7 illustrates an example of performing a computation operation based on an artificial intelligence model by using pre-computed values of an electronic device 101 according to various embodiments.

According to various embodiments, in operation 501, the electronic device 101 may apply a noise value to weight values of at least a part of a plurality of layers included in an artificial intelligence model stored in the electronic device 101, so as to acquire the weight values to which the noise value is applied. For example, as shown in FIG. 6A, the electronic device 101 (e.g., the processor 250) may select at least partial layer (n) from among the plurality of layers of the artificial intelligence model 231 in the trusted execution environment 320 (operation 601), may apply weight noise (zn) 631 to weight values (e.g., w) (or a weight matrix (An)) of the selected layer (n) and generate a weight matrix (An') 633 to which weight values (e.g., w') (or noise (zn) 631), having the noise value applied thereto, is applied (operation 603), and may generate input noise (Rn) 651 to be applied to input data (Xn) to be input in the selected layer (n) (operation 605), wherein the sequences of operations 601, 603, and 605 are not limited to the description above, and the operations may be performed according to various sequences. Operations 601, 603, and 605 may be defined as a precomputation operation. As shown in FIG. 6A, as an execution environment (or execution mode) of the processor 250 is switched to the trusted execution environment 320 by the FIQ or IRQ for environment switching and the monitor mode 247, the processor 250 may perform the operations (operations 601, 603, and 605). However, the disclosure is not limited to the description above, and the operations may be performed by managing the above-described virtual OSs (e.g., an implementation example as shown in FIGS. 3A and 3B), or based on independently provided hardware (e.g., an implementation example as shown in FIG. 3C), and thus, a redundant description will be omitted. The pre-computation operation may be performed in an idle state of the electronic device 101, and accordingly, when the state of the electronic device 101 is the idle state, the execution environment of the processor 250 may be switched to the trusted execution environment 320 for performing the pre-computation operation. Description of the idle state will be made later in FIGS. 8 and 9. According to an embodiment, the electronic device 101 (e.g., the processor 250) may perform pre-computation operations (operations 601, 603, and 605) for each of a plurality of artificial intelligence models 231 stored in the memory 230. In another embodiment, the electronic device 101 (e.g., the processor 250) may perform the pre-computation operation only for some of the plurality of artificial intelligence models 231. For example, a manufacturer of the artificial intelligence model, a manufacturer of an application corresponding to the artificial intelligence model, or a user of the artificial intelligence model (or a user of the electronic device 101) may predetermine whether to perform the pre-computation operation for the artificial intelligence model, and pre-store information indicating whether to perform the pre-computation operation in the electronic device 101. The processor 250 may perform the pre-computation operation for some of the plurality of artificial intelligence models 231, based on the information. Hereinafter, the pre-computation operation will be described in more detail.

According to various embodiments, the electronic device 101 (e.g., the noise addition module 241) may select a part (n) of the plurality of layers of a part (e.g., A model) of the plurality of artificial intelligence models 231. For example, the noise addition module 241 may select a part of the layers remaining after excluding the first layer from among the plurality of layers of the artificial intelligence model (e.g., A model). The first layer may be defined as a layer in which computation is performed first when input data (Xn) 711 is input to the artificial intelligence model (e.g., A model). In the trusted execution environment 320, the processor 250 may compute data input to the first layer, based on weights, a bias, and/or an activation function of the first layer so as to prevent input data (Xn) 711 from being exposed to the outside. However, the disclosure is not limited to the description above, and the noise addition module 241 may also select a part (n) of layers from among the plurality of layers including the first layer. The noise addition module 241 may select a part (n) of layers, based on designated information. In an embodiment, the designated information may include information indicating layers (n) selected by a manufacturer of the artificial intelligence model (e.g., A model) or an application (e.g., A app) associated with the artificial intelligence model (e.g., A model) so that the pre-computation operation is to be performed. The noise addition module 241 may select a part (n) of the plurality of layers included in the artificial intelligence model (e.g., A model), based on the information indicating the layers. In another embodiment, the designated information may include information on a feature of a layer. The information on the feature of the layer may indicate whether the weight values (An) (or the weight matrix) included in the layer has linearity. The noise addition module 241 may select, based on the characteristics of the layer, some layers (n) having weights with the linearity from among the plurality of layers. In another embodiment, the designated information may include information indicating an idle resource of the electronic device 101. For example, the noise addition module 241 may determine the number of layers to be selected from among the plurality of layers, in proportion to the size of the idle resource, based on the information indicating the idle resource. In this case, the layers selected according to the determined number may be layers configured to have higher priorities than layers that are not selected. The priorities may be predetermined by the manufacturer of the artificial intelligence model (e.g., A model) or the application (e.g., A app) associated with the artificial intelligence model (e.g., A model). All of the above-described embodiments may be combined and performed, but the disclosure is not limited thereto, and only some of the embodiments may be performed.

According to various embodiments, the noise addition module 241 may generate a noise value (the above-described weight noise (zn) 631) to be applied to weight values (e.g., w) (or a weight matrix (An)) of the selected layers (n). The value of the weight noise (zn) 631 may be generated with a random value within a designated range (e.g., a range of 0.9 below or a range of 1.1 or above), the value of the weight noise (zn) 631 may be determined according to computation ability of the computation device 220 as described in FIGS. 2 to 4, and thus, a redundant description will be omitted. The value of the weight noise (zn) 631 may be generated within different ranges designated for layers, respectively, but the disclosure is not limited thereto, and the value of the weight noise (zn) 631 may be generated with the same value. The noise addition module 241 may apply the generated weight noise (zn) 631 to the weight values (w) (or the weight matrix (An)) of the selected layer (n) (e.g., multiply the generated weight noise (zn) 631 and the weight values (or the weight matrix (An)) of the selected layer), and may store the weight values (w') (or the weight matrix (An') 633) to which the weight noise (zn) is applied. As shown in FIG. 6A, the noise addition module 241 may store, in a specific area 313 in the memory 230, the specific area 313 being assigned to the rich execution environment 310, the weight values (An) to which the weight noise (zn) 631 is applied, so as to allow the same to be used in the rich execution environment 310. In another embodiment, the noise addition module 241 may store the weight values (An) in the specific area 313*a* in the memory 230*a* as shown in FIG. 3C.

According to various embodiments, the noise addition module 241 may generate the noise values (the above-described input noise (Rn) 651) to be added to the input data (Xn) 711 input to the selected layers (n). For example, the noise addition module 241 may generate a noise vector having the size corresponding to the size (or number) of input data (Xn) input to the selected layers (n), as the input noise (Rn) 651. The value (e.g., r1, r2, r3, or r4) of the input noise (Rn) 651 may be generated within a designated range (e.g., a range of values that the input data (Xn) can have), and each value (e.g., r1, r2, r3, or r4) may be randomly generated. The noise addition module 241 may store the generated input noise (Rn) 651 in a specific area 313 in the memory 230, the specific area 313 being assigned to the rich execution environment 310, so as to allow the same to be used in the rich execution environment 310.

According to various embodiments, as shown in FIG. 6B, the electronic device 101 (e.g., the processor 250) may pre-store values (hereinafter, referred to as pre-computed values) generated for each of the layers (n) selected in the trusted execution environment 320. For example, the pre-computed values may include weight noise (zn) 631 for each of the selected layers (n), a weight matrix (An') 633 to which the weight noise (zn) 631 is applied, an input noise vector (Rn) 651, a bias vector (Bn), and/or a noise subtraction matrix (Tn). The noise subtraction matrix (Tn) may be obtained as shown in [Equation 2] below, and as to be described below, the noise subtraction matrix (Tn) may be a matrix for performing subtraction from computation data (Yn') 731 computed in the rich execution environment 310. When computing Tn, (+, −) of each value may be implemented inversely from the description, and in this case, Tn may be subtracted from Yn' to be described below.

$$Tn = -\frac{An \times Rn}{Zn} - Bn \quad \text{[Equation 2]}$$

In [Equation 2], n denotes an identifier (or sequence) of the selected layer(s), An denotes a weight matrix for each of the selected layer(s), Rn denotes input noise for each of the selected layer(s), zn denotes weight noise for each of the selected layer(s), and Bn denotes a bias vector for each of the selected layer(s).

As shown in FIG. 6B, at least a part of the values may be stored in the memory 311 assigned to the trusted execution environment 320 and may be used in the trusted execution environment 320. The at least a part (e.g., the weight value (An') to which the noise value is applied) of the values may be stored in the specific area 313 in the memory 311, the specific area 313 being pre-assigned in the rich execution environment 310, and may be used in the rich execution environment 310. In this case, for security, the bias vector (Bn) and/or the noise subtraction matrix (Tn) among the values may not be stored in the specific area 313 in the memory 311, the specific area 313 being assigned in the rich execution environment 310, and may be stored only in the memory 311 assigned to the trusted execution environment 320. The disclosure is not limited to the description and/or illustration above, and for example, in order to reduce a data storage amount, among the values, the input noise (Rn) and the bias (Bn) may not be stored, and only the noise subtraction matrix (Tn) may be stored.

According to various embodiments, in operation 503, the electronic device 101 may determine whether an event for execution of the artificial intelligence model has occurred. For example, as shown in FIG. 7, the electronic device 101 may identify, based on execution of a designated application (e.g., A app), occurrence of an event for execution of an artificial intelligence model (e.g., A model) associated with the executed application (e.g., A app). In an embodiment, the electronic device 101 may execute a designated artificial intelligence model for performance of a function based on the application. As shown in 510 of FIG. 5B, a camera application 511 may be implemented to process an acquired image or video and provide a mode 513 for acquiring information on objects (or subjects). Accordingly, as shown in 520 of FIG. 5B, when the mode 513 is selected on an execution screen of the camera application 511 by a user, the electronic device 101 may identify that an event for processing of data (or a content) has occurred. The electronic device 101 may identify the artificial intelligence model (e.g., A model) configured to correspond to the camera application 511 (or implemented to provide a subject recognition function corresponding to the mode 513), from the plurality of artificial intelligence models 231. The identified artificial intelligence model (e.g., A model) may be implemented to output information on the subject (e.g., a probability of existence of the subject) in response to input of image data. The electronic device 101 may provide the acquired data (e.g., images 512 and 521) as input data for computation, based on the execution of the camera application 511. In another embodiment, the electronic device 101 may also execute a preconfigured artificial intelligence model to be associated with the executed application. In this case, information on the artificial intelligence model corresponding to each application is pre-stored in the electronic device 101, and the electronic device 101 (e.g., the processor 250) may identify and/or execute the artificial intelligence model corresponding to the executed application by referring to the stored information.

According to various embodiments, when it is determined that the event for execution of the artificial intelligence model has occurred, the electronic device 101 may acquire, in operation 505, computation data, based on computation of data input to the at least part of the plurality of layers, by using the weight values to which the noise value is applied, and may acquire, in operation 507, output data based on the acquired computation data and the applied noise value. As shown in FIG. 7, when performing computation based on some layers (n) in which the pre-computation operation is performed, among the plurality of layers of the artificial intelligence model, in which the execution event has occurred, the electronic device 101 may apply input noise (Rn) 651 to data (Xn) 711 input to the layers so as to acquire data (Xn') 713 to which the input noise (Rn) 651 is applied, in the trusted execution environment 320 (operation 701); may acquire computation data (Yn') 731 by computing the data (Xn') 713 to which the input noise (Rn) 651 is applied and the weight values (or a matrix (An') 633) to which the weight noise (zn) 631 is applied, in the rich execution environment 310 (operation 703); and may subtract noise values from the computation data (Yn') 731 in the trusted execution environment 320 (operation 705). Operations 701, 703, and 705 may be defined as layer computation operations. To perform operations 701, 703, and 705, the execution environment of the electronic device 101 may be switched (or changed). The electronic device 101 (e.g., the processor 250) may execute the artificial intelligent model (e.g., model A) by switching (changing or configuring) the execution environment to the trusted execution environment 320, based on the occurrence of the event for execution of the artificial intelligence model (e.g., model A). Thereafter, operation 701 is performed in the trusted execution environment 320, and after operation 701 is completed, the execution environment of the electronic device 101 may be changed from the trusted execution environment 320 to the rich execution environment 310. Operation 703 is performed in the rich execution environment 310, after operation 703 is completed, the execution environment of the electronic device 101 may be changed from the rich execution environment 310 to the trusted execution environment 320, and operation 705 may be performed in the trusted execution environment 320. The electronic device 101 (e.g., the processor 250) may perform computation in the trusted execution environment 320 for the first layer of the artificial intelligence model (e.g., model A). For example, for the first layer of the artificial intelligence model (e.g., model A), the electronic device 101 may perform normal computation based on weight values (A1), a bias (B1), and an activation function, and may continuously perform the above-described layer computation operations (operations 701, 703, and 705) in at least a part of the remaining layers by using data output as a result of the performance of the computation. Hereinafter, the layer computation operations (operations 701, 703, and 705) may be further described.

According to various embodiments, when a layer for performing current computation corresponds to a layer in which a pre-computation operation is performed, the processor 250 (e.g., the noise addition module 241) may acquire input data (Xn') 713 to which input noise (Rn) 651 is applied by applying (e.g., adding) the input noise (Rn) 651 to input data (Xn) 711 input to the layer, in the trusted execution environment 320. The noise addition module 241 may identify the input noise (Rn) 651 for the layer in which the current computation is performed, based on the pre-stored information described in FIG. 6B above, and may apply (e.g., add) the identified input noise (Rn) 651 to the input data (Xn) 711. The noise addition module 241 may store the input data (Xn') 713 to which the input noise (Rn) 651 is applied in the specific area 313, in the memory 230, the specific area 313 being assigned to the rich execution environment 310. When the input data (Xn') 713 to which the input noise (Rn) 651 is applied is stored, the processor 250 may switch the execution environment to the rich execution environment 310.

According to various embodiments, the processor 250 (e.g., the computation performance module 243) may acquire computation data (Yn') 731 in the rich execution environment 310 by computing (e.g., performing matrix multiplication) the input data (Xn') 713 to which the input noise (Rn) 651 is applied and the weight values (An') 633 to which the weight noise (zn) 631 is applied. The computation performance module 243 may access the specific area 313 in the memory 230, the specific area 313 being assigned in the rich execution environment 310, and may identify the input data (Xn') 713 to which the input noise (Rn) 651 is applied and the weight values (An') 633 to which the weight noise (zn) is applied. The computation performance module 243 may store the computation data (Yn') 731 generated according the computation, in the specific area 313 in the memory 230, the specific area 313 being assigned to the rich execution environment 310. When the computation data (Yn') 731 is stored, the processor 250 may switch the execution environment to the trusted execution environment 320.

According to various embodiments, the processor 250 (e.g., the output data acquisition module 245) may acquire output data (Yn) 751 by subtracting the noise values from the computation data (Yn') 731 in the trusted execution environment 320. For example, as shown in [Equation 3] below, the output data acquisition module 245 may acquire output data by subtracting the pre-stored weight noise (zn) 631 from the computation data (Yn') 731 (e.g., dividing the computation data (Yn') 731 by the pre-stored weight noise (zn) 631) and adding the noise subtraction matrix (Tn) thereto. When computing Tn, (+, −) of each value may be implemented inversely from the description, and in this case, Tn may be subtracted from Yn' to be described below. The disclosure is not limited to the description above, and when there is no bias in the corresponding layer, An*Rn/zn may be subtracted from the computation data (Yn') 731 instead of adding the noise subtraction matrix.

$$Yn = \frac{Yn'}{Zn} - Tn \qquad \text{[Equation 3]}$$

In [Equation 3], n denotes an identifier (or sequence) of a layer in which computation is performed, Yn denotes output data, Yn' denotes computation data, zn denotes weight noise for each layer, and Tn denotes a noise subtraction matrix in [Equation 3].

According to various embodiments, the processor 250 may continuously perform computation using the acquired output data (Yn) 751 as input data of the next layer. In this case, when there is an activation function in the layer in which current computation is performed, the processor 250 may continuously perform the computation by using, as input data of the next layer, the data output by applying the activation function to the output data.

According to various embodiments, when the computation for the current layer is completed, the processor 250 may remove the pre-computed values (e.g., the weight noise (zn) 631, the weight matrix (An') 633 to which the weight noise (zn) 631 is applied, the input noise vector (Rn) 651, the bias vector (Bn), and/or the noise subtraction matrix (Tn)) for the current layer from the memory 230, but the disclosure is not limited thereto.

Various embodiments illustrate that the electronic device 101 performs computation, in operation 505, based on the pre-computed values when the event for execution of the artificial intelligence model has occurred in operation 503. However, the disclosure is not limited, and operation 503 may be performed after the event for execution of the artificial intelligence model occurs. For example, when the event for execution of the artificial intelligence model has occurred, the electronic device 101 may generate values (e.g., the weight noise (zn) 631 for each of the selected layers (n), the weight matrix (An') 633 to which the weight noise (zn) is applied, the input noise vector (Rn) 651, the bias vector (Bn), and/or the noise subtraction matrix (Tn)) for a layer, and perform computation for the layer, based on the generated values.

Hereinafter, an example of an operation of the electronic device 101 according to various embodiments is described.

According to various embodiments, when the state of the electronic device 101 is an idle state, the electronic device 101 may perform a pre-computation operation for an artificial intelligence model 231.

Figure 8:
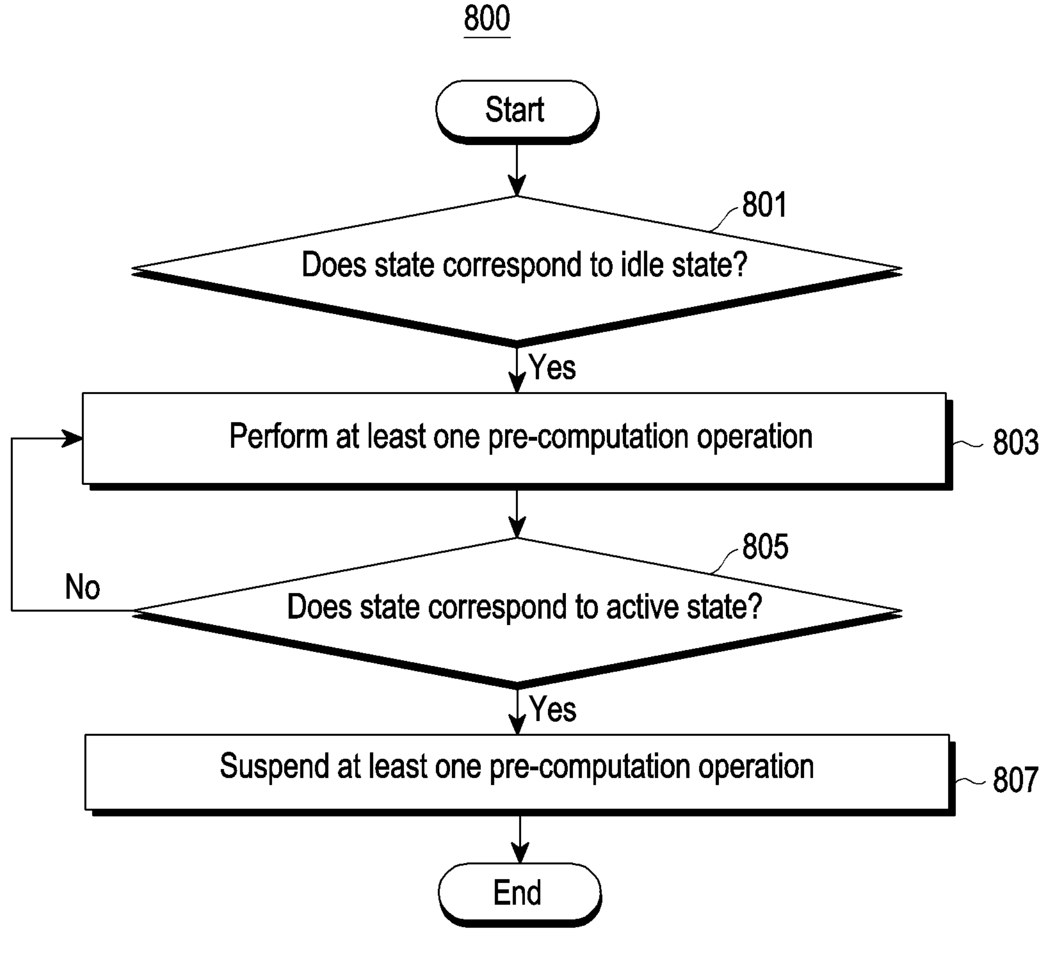
FIG. 8 is a flow chart illustrating an example of an operation of the electronic device according to various embodiments.

FIG. 8 is a flow chart 800 illustrating an example of an operation of the electronic device 101 according to various embodiments. The sequences of the operations illustrated in FIG. 8 are not limited to the illustrated sequences, and may be performed according to various sequences. In addition, according to various embodiments, operations more than or at least one operations fewer than the operations illustrated in FIG. 8 may be performed. Hereinafter, FIG. 8 is described with reference to FIG. 9.

Figure 9:
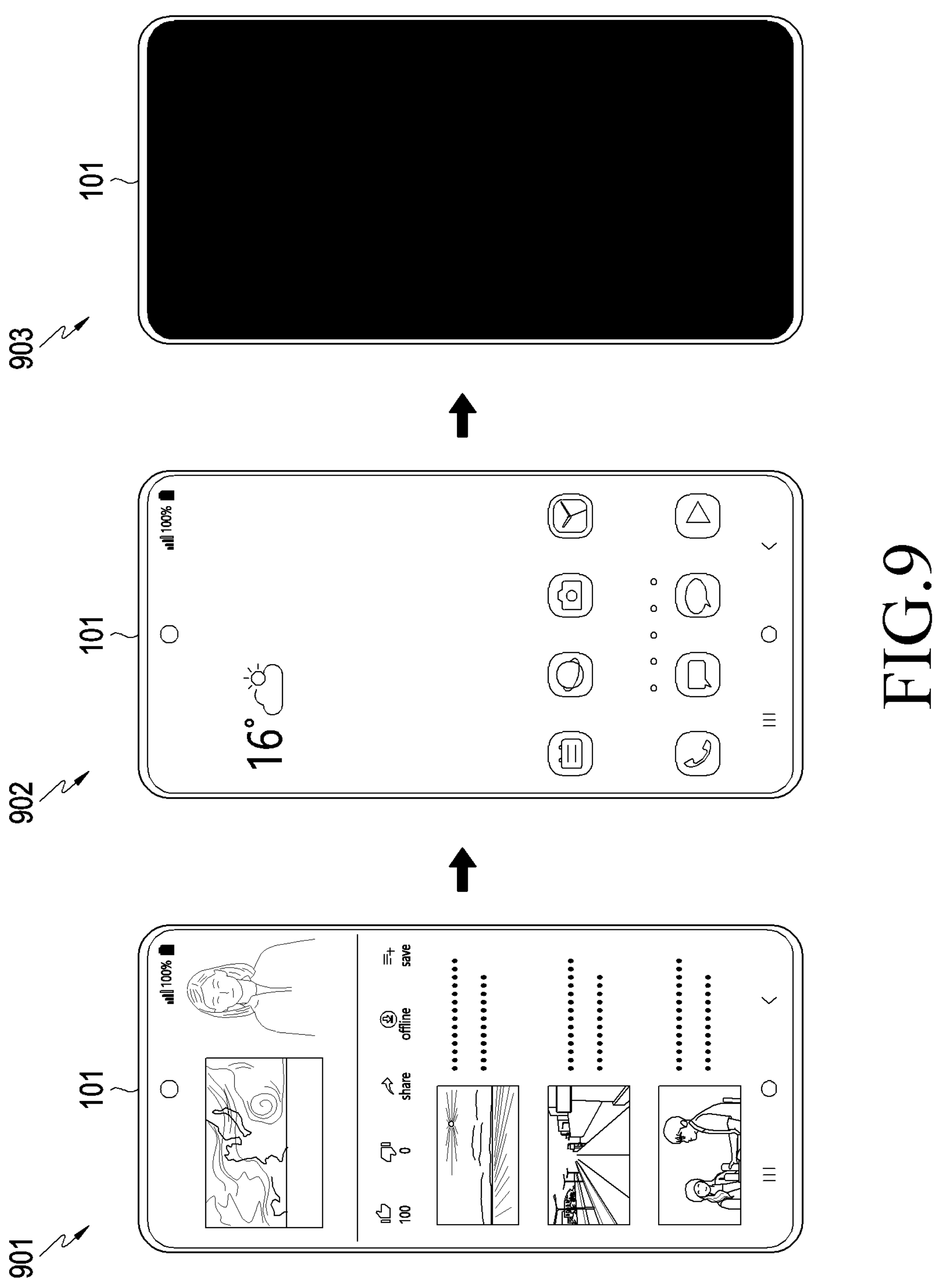
FIG. 9 illustrates an example of an idle state and an active state of an electronic device according to various embodiments.

FIG. 9 illustrates an example of an idle state and an active state of an electronic device 101 according to various embodiments.

According to various embodiments, in operation 801, the electronic device 101 may determine whether the state of the electronic device corresponds to an idle state. For example, the state of the electronic device 101 may include an idle state and an active state. The idle state indicates the state in which a processor (e.g., the processor 250 of FIGS. 3A and 3B or the second processor 250*b* of FIG. 3C) has sufficient resources to perform an operation in a trusted execution environment 320, and the active state indicates the state in which a processor (e.g., the processor 250 of FIGS. 3A and 3B or the second processor 250*b* of FIG. 3C) has insufficient resources to perform an operation in the trusted execution environment 320. The resources may include at least one of usage of the processor (e.g., the processor 250 of FIGS. 3A and 3B or the second processor 250*b* of FIG. 3C) or the number of processes (or operations, programs or applications) executed by the processor (e.g., the processor 250 of FIGS. 3A and 3B or the second processor 250*b* of FIG. 3C). The usage of the processor may be monitored by means of various types of time counters. Hereinafter, an example of an operation of determining the idle state of the electronic device 101 according to each of the above-described implementation examples (e.g., an implementation example of FIG. 3A, an implementation example of FIG. 3B, and an implementation example of FIG. 3C) of the electronic device 101 will be described.

According to various embodiments, as shown in FIGS. 3A and 3B, when the electronic device 101 is implemented in a single processor 250 and there are sufficient resources of the processor 250, the electronic device 101 may determine that the state of the electronic device 101 corresponds to an idle state. For example, when the resource of the processor 250 has a value equal to or greater than a pre-configured value, the electronic device 101 may determine that the state of the electronic device 101 corresponds to an idle state, and when the resource has a value smaller than the pre-configured value, the electronic device 101 may determine that the state of the electronic device 101 corresponds to an active state. In an embodiment, when the usage of the processor 250 has a value equal to or greater than a pre-configured value, the electronic device 101 determines that the state of the electronic device 101 corresponds to an active state, and when the resource has a value smaller than a pre-configured value, the electronic device 101 may determine that the state of the electronic device corresponds to an idle state. For example, as shown in 901 of FIG. 9, the usage of the processor 250 identified as the processor 250 executes at least one application may have a value equal to or greater than the pre-configured value. The at least one application may be executed in a foreground mode or a background mode. In this case, the electronic device 101 may determine that the state of the electronic device 101 corresponds to an active state. In another example, when the number of applications in execution is small as shown in 902 in FIG. 9, or when there is no application in execution as shown in 903 in FIG. 9, the usage of the processor 250 may have a value smaller than the pre-configured value. In this case, the electronic device 101 may determine that the state of the electronic device 101 corresponds to an idle state. In another embodiment, when the number of applications (or processor or programs) in execution is equal to or greater than the pre-configured value, the electronic device 101 may determine that the state of the electronic device 101 corresponds to an active state, and when the number of applications (or processor or programs) in execution is smaller than the pre-configured value, the electronic device 101 may determine that the state of the electronic device corresponds to an idle state.

According to various embodiments, when the electronic device 101 is implemented as a multiprocessor (e.g., the first processor 250*a* and the second processor 250*b*) as shown in FIG. 3C, the electronic device 101 may determine that the state of the electronic device 101 corresponds to an idle state in a case where there are sufficient resources of the processor (e.g., the second processor 250*b*) assigned to the trusted execution environment 320. As described above, the electronic device 101 may determine the state (e.g., the idle state or the active state) of the electronic device 101, based on comparison between the pre-configured value and the number of applications (or the processes or the programs) executed by the processor (e.g., the second processor 250*b*) or the usage of the processor (e.g., the second processor 250*b*) assigned to the trusted execution environment 320, and thus, a redundant description will be omitted. Depending on whether a program (e.g., a security tool) executed only for the trusted execution environment 320 by the processor (e.g., the second processor 250*b*) assigned to the trusted execution environment 320 is in execution, the quantity of resources of the processor (e.g., the second processor 250*b*) may vary.

According to various embodiments, when the state of the electronic device 101 corresponds to an idle state, the electronic device 101 may perform at least one pre-computation operation in operation 803. For example, in the trusted execution environment 320, the electronic device 101 may perform, for at least a part 231 of a plurality of artificial intelligence models, at least one of an operation of selecting at least partial layer (n) from among a plurality of layers of the artificial intelligence model 231 (operation 601), an operation of applying weight noise (zn) to weight values (e.g., v) (or a weight matrix (An)) of the selected layer (n) to generate weight values (e.g., w') to which the noise is applied (or a weight matrix (An') 633 to which the noise (zn) is applied) (operation 603), or an operation of generating input noise (Rn) 651 to be applied to input data (Xn) to be input in the selected layer (n) (operation 605), based on the determination of the state of the electronic device 101 as the idle state. Each of the operations (operations 601, 603, and 605) may be performed as described above in operation 501 of the electronic device 101, and thus, a redundant description will be omitted.

According to various embodiments, the electronic device 101 may not perform the pre-computation operation when the determined state of the electronic device 101 corresponds to an active state.

According to various embodiments, the electronic device 101 may determine, in operation 805, whether the state of the electronic device corresponds to an active state, and when the state of the electronic device corresponds to the active state, the electronic device 101 may suspend the pre-computation operation in operation 807. For example, while performing the pre-computation operation, the electronic device 101 may periodically and/or aperiodically determine the state of the electronic device 101. The operation of determining the state of the electronic device 101 may be performed as described in operation 801 above, and thus, a redundant description will be omitted. When it is determined that the state of the electronic device 101 corresponds to the active state, the electronic device 101 may suspend the pre-computation operation. Thereafter, when the state of the electronic device 101 is changed to the idle state and the pre-computation operation for the artificial intelligence model 231 has not been completed, the electronic device 101 may continuously perform the pre-computation operation. For example, for a layer in which at least one of the weight noise application or input noise generation is not performed, among the plurality of layers of the artificial intelligence model 231, the electronic device 101 may continue to perform an operation of applying the weight noise or generating input noise.

According to various embodiments, when it is determined that the state of the electronic device 101 corresponds to an idle state, the electronic device 101 may continuously perform the pre-computation operation.

Hereinafter, an example of an operation of the electronic device 101 according to various embodiments is described.

According to various embodiments, the electronic device 101 may perform a pre-computation operation for a specific artificial intelligence model 231 until weight noise is applied and the number of layers in which input noise is generated is equal to or larger (or exceeds) a pre-configured number, according to the performance of the pre-computation operation for the specific artificial intelligence model 231.

Figure 10:
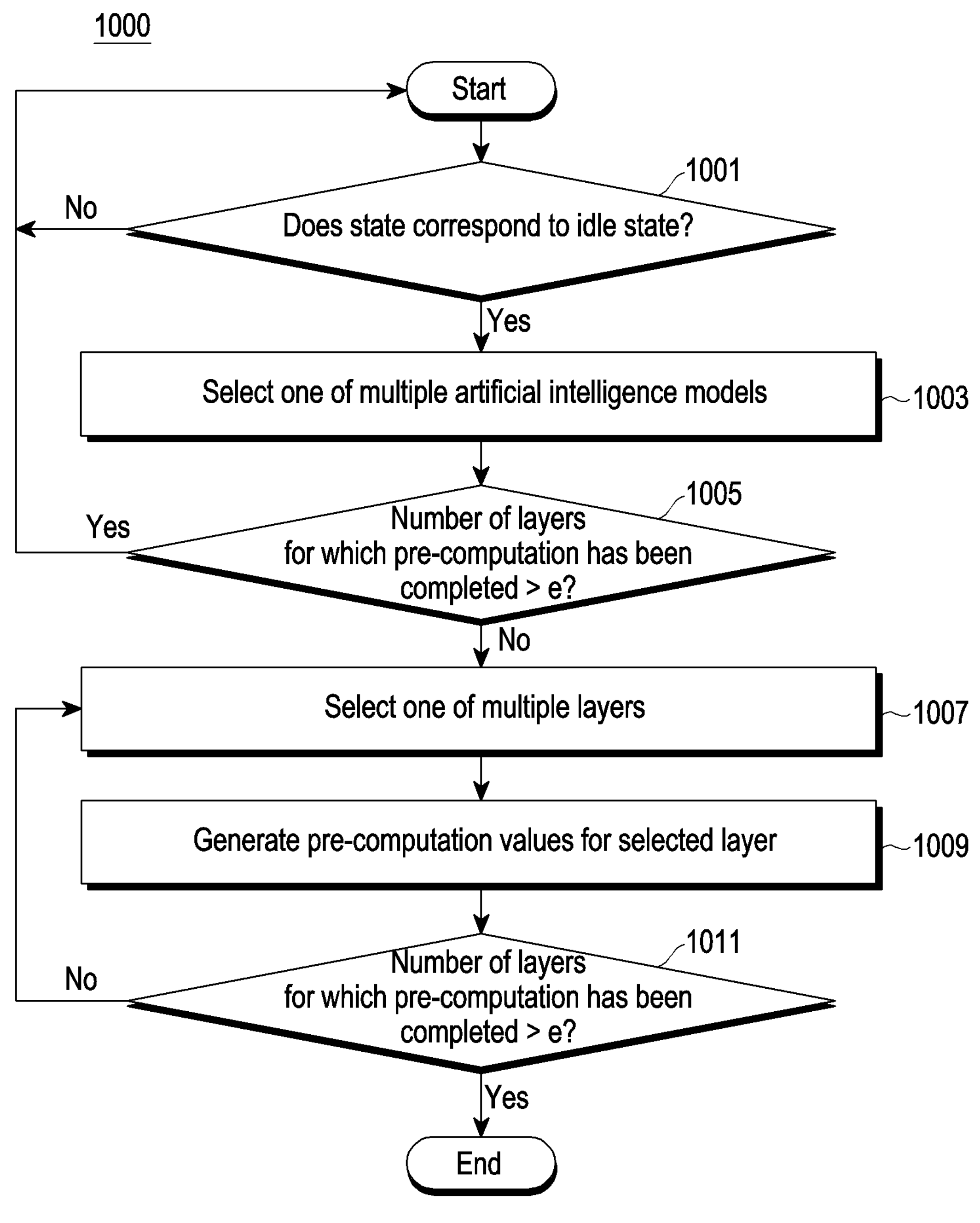
FIG. 10 is a flow chart illustrating an example of an operation of an electronic device according to various embodiments.

FIG. 10 is a flow chart 1000 illustrating an example of an operation of the electronic device 101 according to various embodiments. The sequences of the operations illustrated in FIG. 10 are not limited to the illustrated sequences, and may be performed according to various sequences. In addition, according to various embodiments, operations more than or at least one operation fewer than the operations illustrated in FIG. 10 may be performed. Hereinafter, FIG. 10 will be described with reference to FIG. 11.

Figure 11:
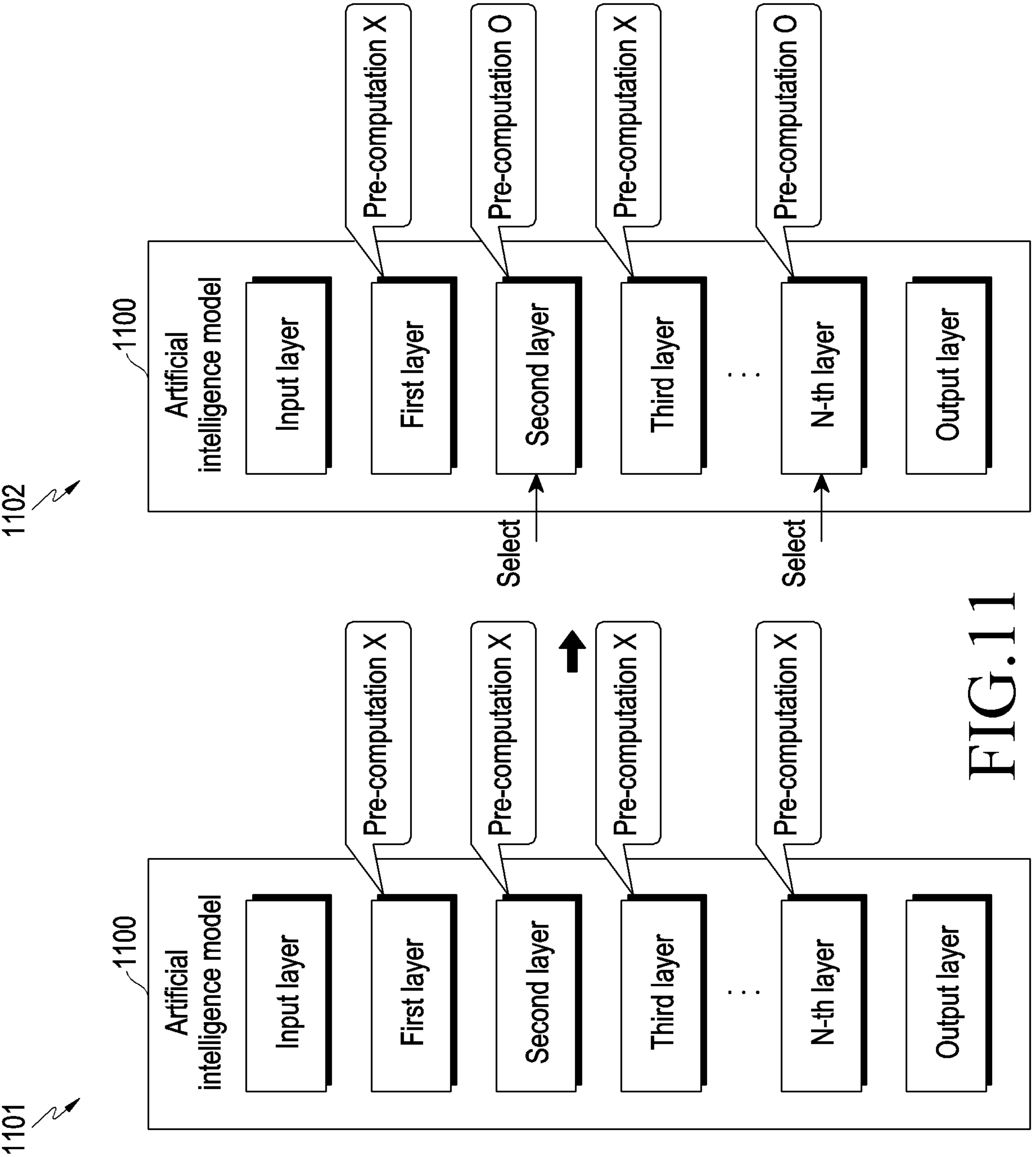
FIG. 11 illustrates an example of an operation in which a pre-computation operation is performed for a selected artificial intelligence model in the idle state of the electronic device according to various embodiments.

FIG. 11 illustrates an example of an operation in which a pre-computation operation is performed for a selected artificial intelligence model in the idle state of the electronic device 101 according to various embodiments.

According to various embodiments, in operation 1001, the electronic device 101 may determine whether the state of the electronic device 101 corresponds to an idle state, and when the state of the electronic device 101 corresponds to the idle state, the electronic device may select one of a plurality of artificial intelligence models in operation 1003. For example, based on comparison between a pre-configured value and a resource of a processor (e.g., the processor 250 of FIGS. 3A and 3B or the second processor 250*b* of FIG. 3C), the electronic device 101 may determine that the state of the electronic device 101 corresponds to an idle state when the resource has a value equal to or greater than the pre-configured value, and may determine that the state of the electronic device 101 corresponds to an active state when the resource has a value smaller than the pre-configured value. The operation of determining the state of the electronic device 101 may be performed as shown in operation 501 of the electronic device 101 above, and thus, a redundant description will be omitted. When the state of the electronic device 101 corresponds to the idle state, the electronic device 101 may select an artificial intelligence model 1100 for which a pre-computation operation is to be performed from among a plurality of artificial intelligence models 231. For example, the electronic device 101 may select at least one artificial intelligence model 1100 for which the pre-computation has not be completed from among the plurality of artificial intelligence models 231. When the pre-computation is completed, it may mean that the number of layer in which the pre-computation operation has been completed, among a plurality of layers included an artificial intelligence model, is equal to or greater than a pre-configured value. In an embodiment, when selecting the artificial intelligence model 1100, the electronic device 101 may randomly select the artificial intelligence model 1100 from the remaining artificial intelligence models for which the pre-computation operations has not been completed from among the plurality of artificial intelligence models 231. In an embodiment, when selecting the artificial intelligence model 1100, the electronic device 101 may select, according to a designated sequence, the artificial intelligence model 1100 from the remaining artificial intelligence models for which the pre-computation operation has not been completed, among the plurality of artificial intelligence models 231. The selecting of the artificial intelligence model 1100 according to the designated sequence may include selecting an artificial intelligence model having a higher priority earlier than the artificial intelligence model 1100 having a lower priority. The priorities may be configured in proportion to the complexity of the artificial intelligence model. For example, the more the number of layers included in the artificial intelligence or the larger the capacity of the artificial intelligence model, it may be determined that the complexity of the artificial intelligence model is high. In an embodiment, when a manufacturer predetermines that pre-computation is not needed for a specific artificial intelligence model, the electronic device 101 may not perform a pre-computation operation for the specific artificial intelligence model. In this case, each of the plurality of artificial intelligence models 231 may include information indicating whether the pre-computation operation needs to be performed, and the electronic device 101 may perform the pre-computation operation only for artificial intelligence models including the information indicating that the pre-computation is needed.

According to various embodiments, the electronic device 101 may compare the pre-configured number with the number of layers for which the pre-computation operations is performed for the artificial intelligence model selected in operation 1005, select one of the plurality of layers in operation 1007 when the number of layers is smaller than the pre-configured number, and generate pre-computed values for the selected layer in operation 1009. For example, as shown in 1101 of FIG. 11, the electronic device 101 may identify whether a pre-computation operation has been completed for a plurality of layers (e.g., a first layer, a second layer, a third layer, . . . , and an n-th layer) included in the selected artificial intelligence model 1100. In an embodiment, the electronic device 101 may identify pre-computed values for at least a part of the plurality of layers of the selected artificial intelligence model 1100, stored in a memory (e.g., the memory 321 assigned to the trusted execution environment 320 or the specific area **313*a* in the memory 311, assigned to the rich execution environment 310), so as to determine whether the pre-computation operation has been completed for the layer. The pre-computed values may include, as described above in FIG. 6B, weight noise (zn) for each of the layers (n), a weight matrix (An') to which the weight noise (zn) is applied, an input noise vector (Rn), a bias vector (Bn), and/or a noise subtraction matrix (Tn). The electronic device 101 may determine that among the plurality of layers, the layers in which the pre-computed values are stored correspond to layers for which the pre-computation operation has been completed, and the layers in which no pre-computed values are stored correspond to layers for which no pre-computation operation has been completed. In an embodiment, the electronic device 101 may identify information indicating completion of pre-computation for layers of the selected artificial intelligence model 1100, stored in a memory (e.g., the memory 321 assigned to the trusted execution environment 320 or the specific area 313*a* in the memory 311, assigned to the rich execution environment 310), so as to determine whether the pre-computation operation has been completed for the layer. For example, after completing a pre-computation operation for a specific layer, the electronic device 101 may store information indicating the completion of the pre-computation operation (e.g., identification information of a specific layer for which the pre-computation operation has been completed) in a memory (e.g., the memory 321 assigned to the trusted execution environment 320 or the specific area 313*a* in the memory 311, assigned to the rich execution environment 310). The electronic device 101** may identify information indicating the completion of the pre-computation operation, the information being pre-stored in the memory, so as to determine that the layers including the information correspond to layers for which a pre-computation operation has been completed, and the layers not including the information correspond to layers for which no pre-computation operations has been completed.

According to various embodiments, the electronic device 101 may identify, based on the determination of whether the pre-computation operation has been completed for the layer, the number of layers for which the pre-computation operation has been completed. In an embodiment, after performing the pre-computation operation for the selected artificial intelligence model 1100, the electronic device 101 may pre-store information on the number of layers for which the pre-computation operation has been completed, and may identify, based on the identification of the stored information, the number of layers for which the pre-computation operation has been completed for the selected intelligence model 1100. The electronic device 101 may compare a pre-configured value (ε) with the number of layers for which the pre-computation operation has been completed, and when the number of layers for which the pre-computation operation has been completed is smaller than the pre-configured value (ε), based on the result of the comparison, the electronic device 101 may perform the pre-computation operation for at least a part of layer among the layers for which the pre-computation operation has not been completed, as shown in 1102 of FIG. 11. As described above, the pre-computation operation may include an operation of applying weight noise (zn) to weight values (e.g., w) (or a weight matrix (An)) of the selected layer (n) and generating weight values (e.g., w') to which the noise is applied (or a weight matrix (An') 633 to which the noise (zn) is applied) (operation 603), and an operation of generating input noise (Rn) 651 to be applied to input data (Xn) to be input to the selected layer (n) (operation 605), and thus, a redundant description will be omitted. When the number of layers for which the pre-computation operation has been completed is greater than the pre-configured value (ε), based on the result of the comparison between the number of layer for which the pre-computation operation has been completed and the pre-configured value (ε), the electronic device 101 may select another artificial intelligence model wherein the number of layer for which the pre-computation operation has been completed is smaller than the pre-configured value (ε). The pre-configured value (ε) may be a pre-stored value to be associated with the plurality of artificial intelligence models 231, but may be adjusted. In addition, different values (ε) may be configured for the plurality of artificial intelligence models 231, respectively. For example, the value (ε) may be pre-configured by a manufacturer of each the plurality of artificial intelligence models 231.

According to various embodiments, the electronic device 101 may randomly select a layer from among layers for which the pre-computation operation has been completed, and perform the pre-computation operation. In this case, as described above, the electronic device 101 may not perform the pre-computation operation for the very first layer (e.g., a first layer). In an embodiment, the electronic device 101 may select a layer according to priorities of layers among the layers for which the pre-computation operation has been completed, and perform the pre-computation operation. For example, the priorities may be predetermined by a manufacturer of the artificial intelligence model 1100 or an application associated with the artificial intelligence model 1100. In another example, the priority of each of the layers of the artificial intelligence model 1100 may be determined to be higher when the capacity of the values (e.g., the weight matrix) included in the layer is greater.

According to various embodiments, after operations 1007 and 1009, the electronic device 101 may compare, in operation 1011, the pre-configured number with the number of layers for which the pre-computation operation has been completed, and may perform operations 1007 and 1009 again when the number of layers for which the pre-computation has been completed is smaller than the pre-configured number. For example, the electronic device 101 may select at least one layer from among the layers for which the pre-computation operation has not been completed, and after completing the pre-computation operation, perform an operation of comparing again the pre-configured value (ε) with the number of layers for which the pre-computation operation has been completed. When the number of layers for which the pre-computation operation has been completed is smaller than the pre-configured value (ε), based on the result of the comparison, the electronic device 101 may perform the pre-computation operation for at least a part of the layers for which the pre-computation operation has not be completed. Alternatively, the electronic device 101 may complete (or suspend) the pre-computation operation for the selected artificial intelligence model 1100 when the number of layers for which the pre-computation operation has been completed is greater than the pre-configured value (ε).

Hereinafter, an example of an operation of an electronic device 101 according to various embodiments is described.

According to various embodiments, when performing computation for a specific artificial intelligence model, the electronic device 101 may perform a normal computation operation for a layer of the specific artificial intelligence model, wherein for the layer, no pre-computation operation has been completed (or no pre-computation operation has been performed), and the electronic device 101 may perform an computation operation, based on pre-computed values, for a layer for which the pre-computation operation has been performed.

Figure 12:
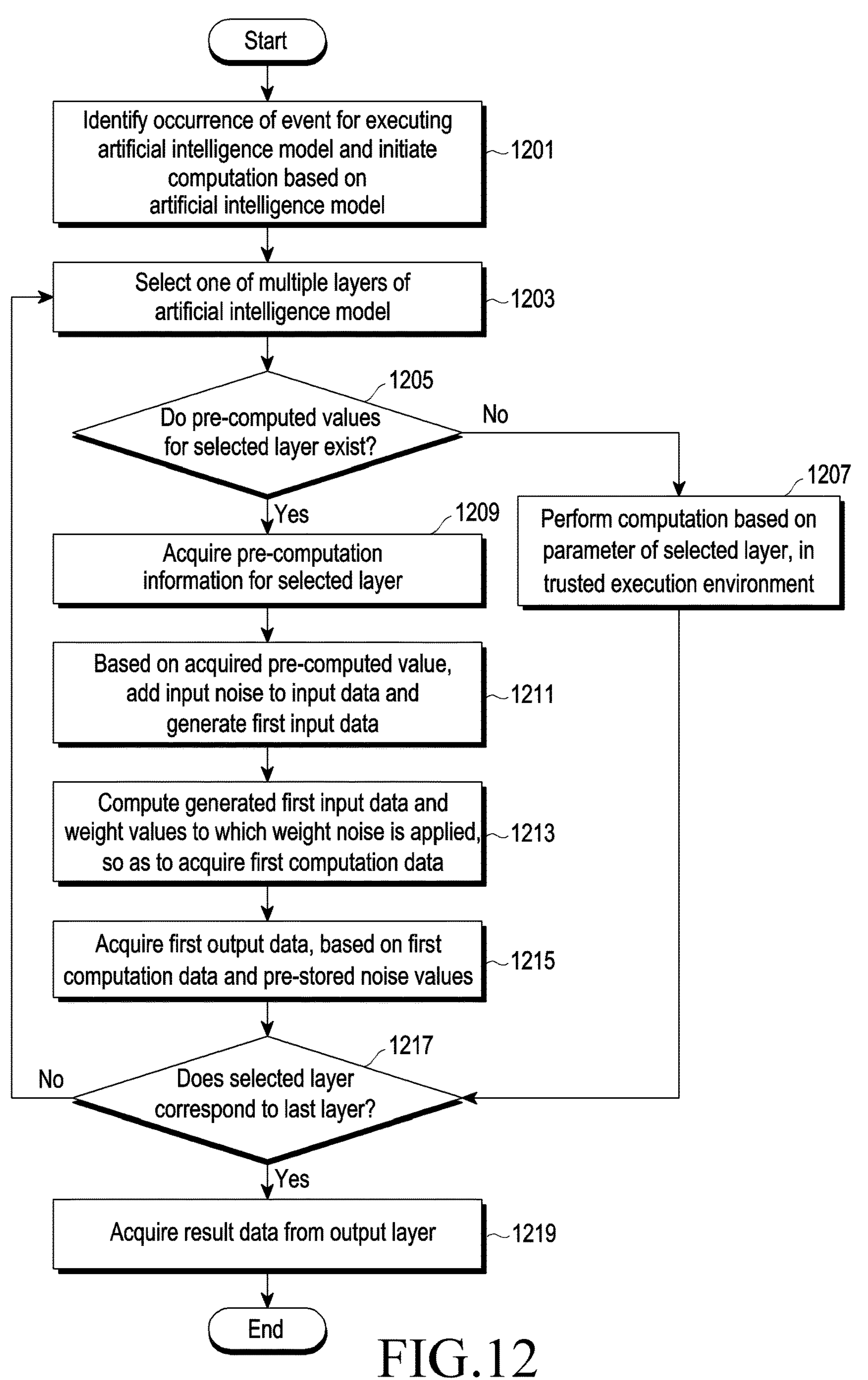
FIG. 12 is a flow chart illustrating an example of an operation of an electronic device according to various embodiments.

FIG. 12 is a flow chart 1200 illustrating an example of an operation of the electronic device 101 according to various embodiments. The sequences of the operations illustrated in FIG. 12 are not limited to the illustrated sequences, and the operations may be performed according to various sequences. In addition, according to various embodiments, operations more than or at least one operation fewer than the operations illustrated in FIG. 10 may be performed. Hereinafter, FIG. 12 will be described with reference to FIGS. 13A and 13B.

Figure 13A:
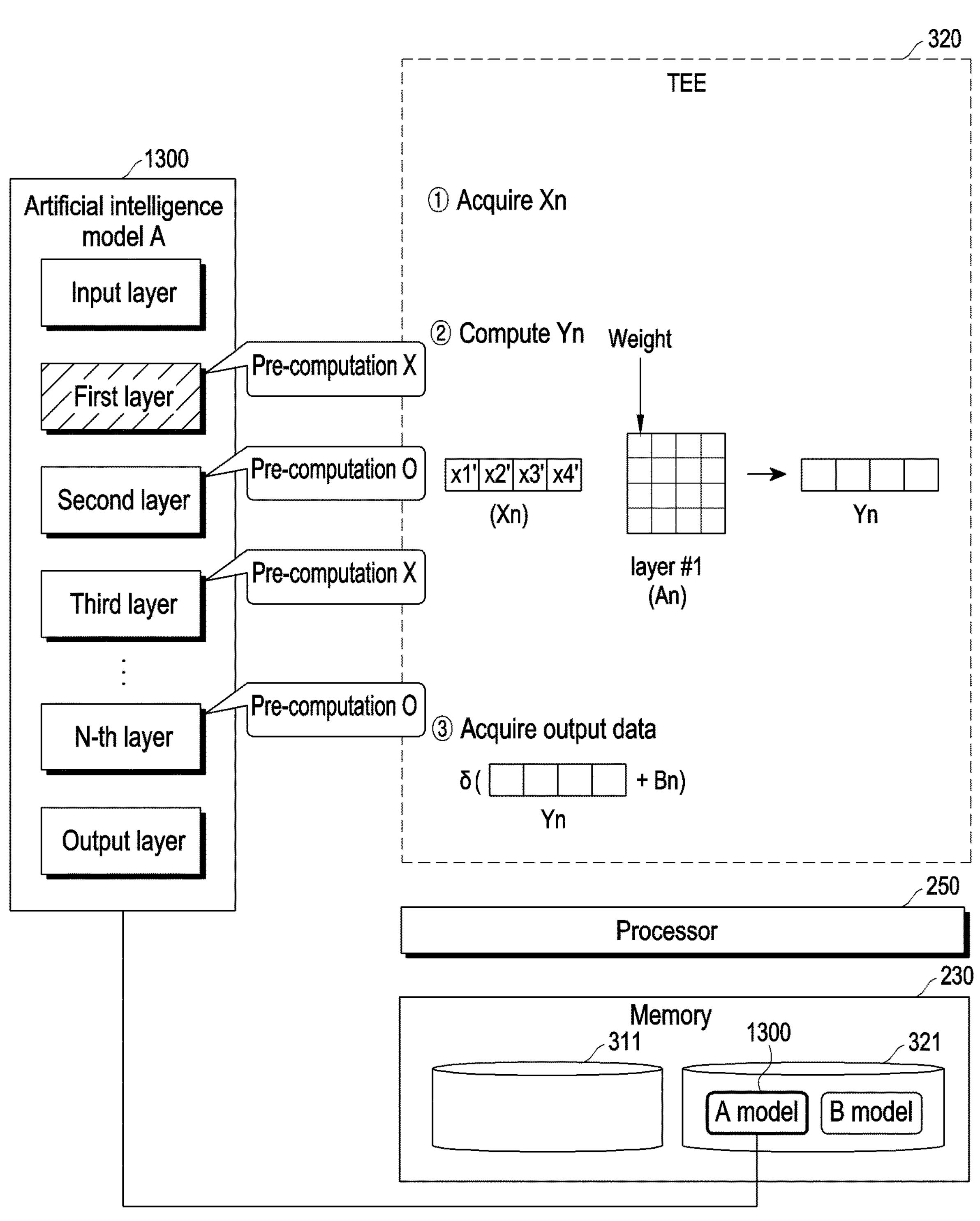
FIG. 13A illustrates an example of an operation of performing computation for a layer of an artificial intelligence model of an electronic device according to various embodiments, wherein for the layer, no pre-computation operation has been completed (or no pre-computation operation has been performed)
Figure 13B:
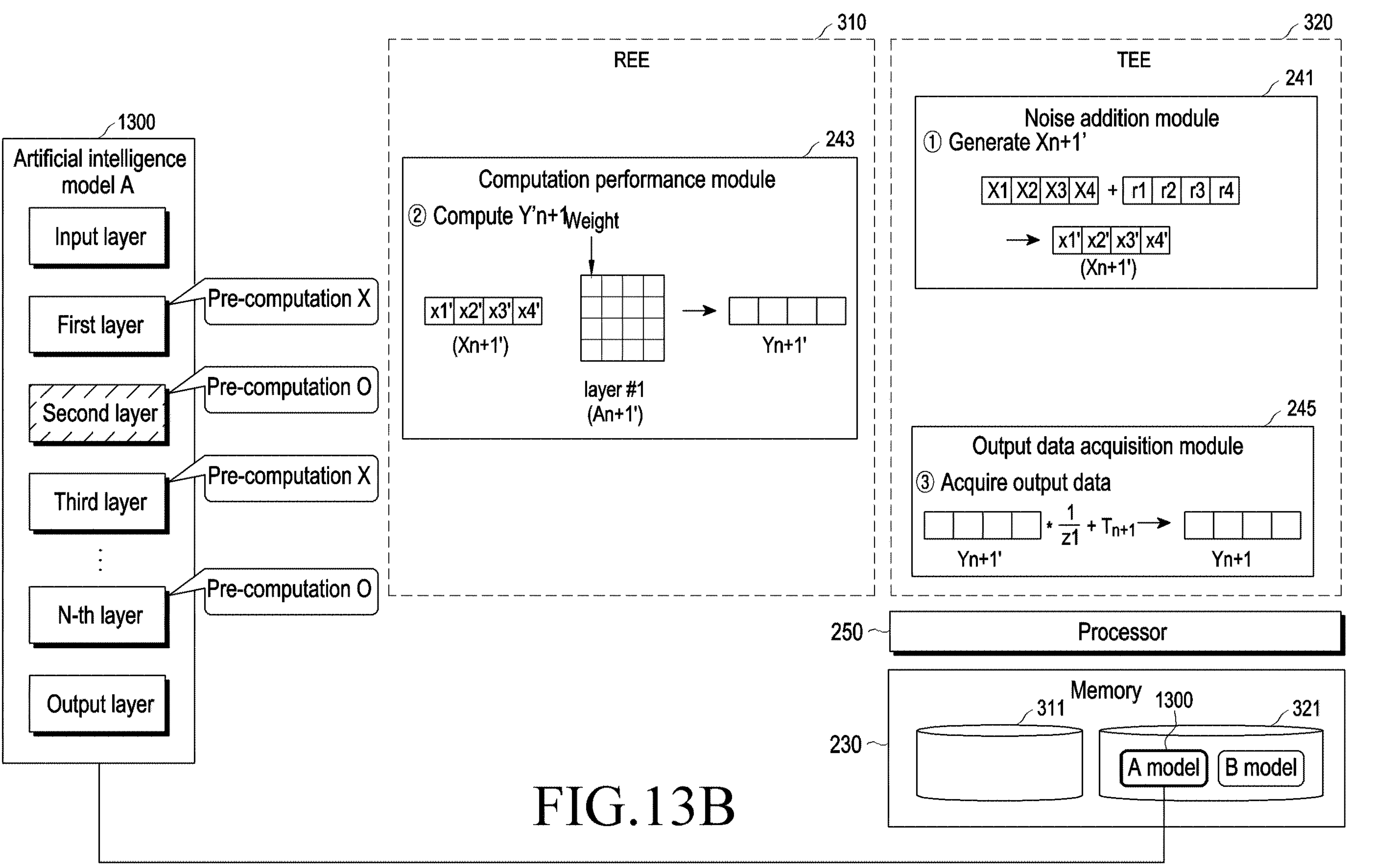
FIG. 13B illustrates an example of an operation of performing computation for a layer of an artificial intelligence model of an electronic device according to various embodiments, wherein for the layer, a pre-computation operation has been completed.

FIG. 13A illustrates an example of an operation of performing computation for a layer of an artificial intelligence model of the electronic device 101 according to various embodiments, wherein for the layer, no pre-computation operation has been completed (or no pre-computation operation has been performed). FIG. 13B illustrates an example of an operation of performing computation for a layer of an artificial intelligence model of the electronic device 101 according to various embodiments, wherein for the layer, a pre-computation operation has been completed.

According to various embodiments, in operation 1201, the electronic device 101 may identify occurrence of an event for executing an artificial intelligence model, and initiate computation based on the artificial intelligence model, and may select one of a plurality of layers of the artificial intelligence model in operation 1203. For example, the electronic device 101 may acquire an event for executing an artificial intelligence model (e.g., artificial intelligence model A 1300), based on execution of an application (e.g., may enter a model for processing data, based on the artificial intelligence model 1300). Based on the occurrence of the event, the electronic device 101 may change an execution environment (or an execution mode) to a trusted execution environment 320 and identify the artificial intelligence model 1300 on the trusted execution environment 320. The electronic device 101 may sequentially select a layer from among a plurality of layers included in the identified artificial intelligence model 1300. For example, the electronic device 101 may select the first layer (e.g., a first layer) from among a plurality of layers (e.g., a first layer, a second layer, a third layer, . . . , and an n-th layer) as shown in FIG. 13A.

According to various embodiments, the electronic device 101 may determine whether there is a pre-computed value for the selected layer in operation 1205. In an embodiment, the electronic device 101 may identify whether pre-computed values (e.g., weight noise (zn) for each of the layers (layer #n), a weight matrix (An') to which the weight noise (zn) is applied, an input noise vector (Rn), a bias vector (Bn), and/or a noise subtraction matrix (Tn)) for the selected layer (e.g., the first layer or the second layer) of the artificial intelligence model 1300 exists in a memory (e.g., the memory 321 assigned to the trusted execution environment 320 or the specific area 313*a* in the memory 311, assigned to the rich execution environment 310) (or is stored in the electronic device 101). In an embodiment, the electronic device 101 may determine whether there are pre-computed values for a currently selected layer (e.g., determine that there are pre-computed values when there is information indicating completion of pre-computation for the layer, or determine that there are no pre-computed values when there is no information indicating the completion of pre-computation for the layer), based on the identification of information indicating whether the pre-computation has been completed for the selected layer (e.g., the first layer or the second layer), the information being pre-stored in the memory.

According to various embodiments, when there is no pre-computed value for the selected layer, the electronic device 101 may perform, in operation 1207, computation based on a parameter of a current layer in the trusted execution environment. For example, the electronic device 101 may determine that there is no pre-computed value for the currently selected layer (e.g., the first layer) as shown in FIG. 13A. In this case, the electronic device 101 may perform computation on input data in the trusted execution environment 320, based on at least one parameter (e.g., at least one of weight values (An) (e.g., A1), activation functions, or biases) of the selected layer (layer #n) (e.g., the first layer). For example, the electronic device 101 (e.g., the processor 250) may acquire input data (Xn) and perform computation (e.g., matrix multiplication) on weight values (e.g., the weight matrix (An) (e.g., A1)) of the currently selected layer (e.g., the first layer) and the acquired input data (Xn), in the trusted execution environment 320. The electronic device 101 may perform computation (e.g., matrix addition) on the computation result and the bias (Bn) of the layer (e.g., the first layer) to acquire output data output by applying an activation function when there is an activation function (e.g., Relu). The computation operation in a layer in the artificial intelligence model may be performed by using a method known in the art, and thus, detailed description thereof will be omitted. After acquiring the output data, the electronic device 101 determine whether the current layer corresponds to the last layer in operation 1217, and may continue to sequentially select the next layer (e.g., the second layer) and perform computation in operation 1203 when the current layer does not corresponds to the last layer.

Alternatively, the disclosure is not limited to the description and/or illustration above, and when there is no pre-computed value for the selected layer, the electronic device 101 may also perform a computation operation on the currently selected layer, based on pre-computed values of another layer.

According to various embodiments, when there is a pre-computed value for the selected layer, the electronic device 101 may acquire the pre-computed value for a current layer in operation 1209, and may add input data to input noise, based on the acquired pre-computed value, to generate first input data in operation 1211. For example, when it is determined that there is a pre-computed value for the currently selected layer (layer #n+1) (e.g., the second layer)

as shown in FIG. 13B, the electronic device 101 may perform computation based on the pre-computed value. For example, the electronic device 101 may add input noise to data (e.g., the output data of the first layer) (Xn+1) input to the current layer (layer #n+1) (e.g., the second layer) to acquire input data (Xn+1') to which the noise is applied, in the trusted execution environment 320, and may store the input data (Xn+1') to which the acquired noise is applied in the specific area 313*a* in the memory 311, assigned to the rich execution environment 310. Operation 1211 of the electronic device 101 may be performed in the same manner as the above-described operation (operation 505) of acquiring computation data of the electronic device 101, and thus, a redundant description will be omitted.

According to various embodiments, in operation 1213, the electronic device 101 may perform computation on the generated first input data and the weight values to which the weight noise is applied, so as to acquire first computation data. For example, the electronic device 101 may switch (or change) the execution environment from the trusted execution environment 320 to the rich execution environment 310, and acquire input data (Xnn+1') stored in the specific area 313*a* in the memory 311 and having the noise value applied thereto and weight values (An+1') of the current layer (e.g., the second layer), the weight values having the weight noise applied thereto, in the rich execution environment 310. The electronic device 101 may perform computation (e.g., matrix multiplication) on the input data (Xn+1') and the weight values (An+1') of the current layer (e.g., the second layer), the weight values having the weight noise applied thereto, so as to acquire computation data (Yn+1'). The electronic device 101 may store the acquired computation data (Yn+1') in the specific area 313*a* in the memory 311. Operation 1213 of the electronic device 101 may be performed in the same manner as the operation (operation 505) of acquiring computation data of the electronic device 101, and thus, a redundant description will be omitted.

According to various embodiments, the electronic device 101 may acquire, in operation 1215, first output data, based on the first computation data and the pre-stored noise values. For example, the electronic device 101 may switch the execution environment from the rich execution environment 310 to the trusted execution environment 320 and acquire computation data (Yn+1') of the current layer (e.g., the second layer) from the specific area 313*a* in the memory 311. The electronic device 101 may eliminate noise from the computation data (Yn+1') (e.g., divide the computation data (Yn+1') by the input noise (zn+1) and add Tn+1 thereto) so as to acquire output data (Yn+1). Operation 1213 of the electronic device 101 may be performed in the same manner as the operation (operation 507) of acquiring output data of the electronic device 101, and thus, a redundant description will be omitted.

According to various embodiments, the electronic device 101 may determine whether the current layer corresponds to the last layer in operation 1217, and may acquire result data from the output layer in 1219 when the current layer corresponds to the last layer. For example, when the currently selected layer corresponds to the last layer, the electronic device 101 may acquire output data of the last layer as result data.

According to various embodiments, when the current layer does not correspond to the last layer, the electronic device 101 may select one of the plurality of layers of the artificial intelligence model to perform computation on the selected layer in operation 1203. For example, the electronic device 101 may determine whether the current layer corresponds to the last layer and may continue to sequentially select the next layer (e.g., the third layer) to perform computation when the current layer does not correspond to the last layer.

According to various embodiments, an electronic device (e.g., the electronic device 101 of FIG. 2) may be provided, the electronic device (e.g., the electronic device 101 of FIG. 2) including a memory (e.g., the memory 230 of FIG. 2) and at least one processor (e.g., the processor 250 of FIGS. 3A and 3B, the first processor 250*a*, and the second processor 250*b* of FIG. 3C), wherein the at least one processor (e.g., the processor 250 of FIGS. 3A and 3B, the first processor 250*a*, and the second processor 250*b* of FIG. 3C) is configured to, by applying a noise value (e.g., zn of FIG. 6A) to weight values (e.g., An of FIG. 6A) of at least a part of a plurality of layers included in an artificial intelligence model stored in the electronic device (e.g., the electronic device 101 of FIG. 2), obtain the weight values (e.g., An' of FIG. 6A) to which the noise value (e.g., zn of FIG. 6A) is applied; when an event for executing the artificial intelligence model is identified, obtain, based on computation of data input to the at least a part of the plurality of layers, computation data (e.g., Yn' of FIG. 7) by using the weight values (e.g., An' of FIG. 6A) to which the noise value (e.g., zn of FIG. 6A) is applied; and obtain output data (e.g., Yn of FIG. 7), based on the obtained computation data (e.g., Yn' of FIG. 7) and the applied noise value (e.g., zn of FIG. 6A).

According to various embodiments, the electronic device (e.g., the electronic device 101) may be provided, wherein the at least one processor (e.g., the processor 250 of FIGS. 3A and 3B, the first processor 250*a*, and the second processor 250*b* of FIG. 3C) is configured to perform an operation based on a plurality of execution environments, the plurality of execution environments includes a rich execution environment (e.g., the rich execution environment 310 of FIGS. 3A to 3C) and a trusted execution environment (e.g., the trusted execution environment 320 of FIGS. 3A to 3C), and the at least one processor (e.g., the processor 250 of FIGS. 3A and 3B, the first processor 250*a*, and the second processor 250*b* of FIG. 3C) is configured to generate the noise value (e.g., zn of FIG. 6A) and apply the noise value (e.g., zn of FIG. 6A) to the weight values (e.g., An of FIG. 6A) of the at least a part of the plurality of layers, in the trusted execution environment (e.g., the trusted execution environment 320 of FIGS. 3A to 3C), compute, in the rich execution environment (e.g., the rich execution environment 310 of FIGS. 3A to 3C), the data input to the at least a part of the plurality of layers, by using the weight values (e.g., An' of FIG. 6A) to which the noise value (e.g., zn of FIG. 6A) is applied, when the event is identified, and obtain, based on the obtained computation data (e.g., Yn' of FIG. 7) and the applied noise value (e.g., zn of FIG. 6A), the output data (e.g., Yn of FIG. 7) in the trusted execution environment (e.g., the trusted execution environment 320 of FIGS. 3A to 3C).

According to various embodiments, the electronic device (e.g., the electronic device 101 of FIG. 2) may be provided, wherein a first part of the memory (e.g., the memory 230 of FIG. 2) is assigned to the rich execution environment (e.g., the rich execution environment 310 of FIGS. 3A and 3C), a second part of the memory (e.g., the memory 230 of FIG. 2) is assigned to the trusted execution environment (e.g., the trusted execution environment 320 of FIGS. 3A to 3C), and the at least one processor (e.g., the processor 250 of FIGS. 3A and 3B, the first processor 250*a*, and the second processor 250*b* of FIG. 3C) is configured to store the weight values (e.g., An' of FIG. 6A) to which the noise value (e.g., zn of FIG. 6A) is applied, in the first part of the memory (e.g., the memory 230 of FIG. 2) in the trusted execution environment (e.g., the trusted execution environment 320 of FIGS. 3A to 3C), the first part being assigned to the rich execution environment (e.g., the rich execution environment 310 of FIGS. 3A to 3C) and obtain, in the rich execution environment (e.g., the rich execution environment 310 of FIGS. 3A to 3C), the weight values (e.g., An' of FIG. 6A) to which the noise value (e.g., zn of FIG. 6A) is applied.

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to select the noise value (e.g., zn of FIG. 6A) from among values within a designated range, and the values within the designated range include values smaller than 0.9 or values equal to or larger than 1.1.

According to various embodiments, the electronic device (e.g., the electronic device 101 of FIG. 2) may be provided, wherein the electronic device (e.g., the electronic device 101 of FIG. 2) may further include a plurality of computation devices for performing computation based on the artificial intelligence model, the plurality of computation devices are assigned to the rich execution environment (e.g., the rich execution environment 310 of FIGS. 3A to 3C) among the plurality of execution environments, and the at least one processor (e.g., the processor 250 of FIGS. 3A and 3B, the first processor 250*a*, and the second processor 250*b* of FIG. 3C) is configured to compute, in the rich execution environment (e.g., the rich execution environment 310 of FIGS. 3A to 3C) by using the plurality of computation devices, the data input to the at least a part of the plurality of layers, based on the weight values (e.g., An' of FIG. 6A) to which the noise value (e.g., zn of FIG. 6A) is applied.

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to generate, in the trusted execution environment (e.g., the trusted execution environment 320 of FIGS. 3A to 3C), first noise values (e.g., Rn of FIG. 6A) corresponding to input data to be input to the at least a part of the plurality of layers.

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to, by selecting randomly a value from a range of values of the input data to be input, generate each of the first noise values (e.g., Rn of FIG. 6A).

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to, when an event for execution of the artificial intelligence model is identified, by applying the first noise values (e.g., Rn of FIG. 6A) to the data input to the at least a part of the plurality of layers, obtain the data to which the first noise values (e.g., Rn of FIG. 6A) are applied, in the trusted execution environment (e.g., the trusted execution environment 320 of FIGS. 3A to 3C), and change, based on the obtaining of the data to which the first noise values (e.g., Rn of FIG. 6A) are applied, an execution environment of the electronic device (e.g., the electronic device 101 of FIG. 2) from the trusted execution environment (e.g., the trusted execution environment 320 of FIGS. 3A to 3C) to the rich execution environment (e.g., the rich execution environment 310 of FIGS. 3A to 3C).

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to compute, based on the weight values (e.g., An' of FIG. 6A) to which the noise value (e.g., zn of FIG. 6A) is applied, the data to which the first noise values (e.g., Rn of FIG. 6A) are applied, in the rich execution environment (e.g., the rich execution environment 310 of FIGS. 3A to 3C).

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to generate, based on the weight values (e.g., An of FIG. 6A) of the at least a part of the plurality of layers of the artificial intelligence model, the noise values (e.g., zn of FIG. 6A), the first noise values (e.g., Rn of FIG. 6A), and a bias, first values in the trusted execution environment (e.g., the trusted execution environment 320 of FIGS. 3A to 3C), and store the generated first values in a part of the memory (e.g., the memory 230 of FIG. 2).

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to obtain the output data (e.g., Yn of FIG. 7), based on computation of the pre-stored first values and the computation data (e.g., Yn' of FIG. 7) obtained in the rich execution environment (e.g., the rich execution environment 310 of FIGS. 3A to 3C).

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to identify a state of the electronic device (e.g., the electronic device 101 of FIG. 2), and generate the noise value (e.g., zn of FIG. 6A) in the trusted execution environment (e.g., the trusted execution environment 320 of FIGS. 3A to 3C) when the state of the electronic device (e.g., the electronic device 101 of FIG. 2) corresponds to an idle state.

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to identify a number of layers for which the noise value (e.g., zn of FIG. 6A) is generated, among the plurality of layers of the artificial intelligence model; select, when the identified number of layers is smaller than a preset value, a partial layer from among layers for which no noise value (e.g., zn of FIG. 6A) is generated; and generate the noise value (e.g., zn of FIG. 6A) associated with the selected partial layer.

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to refrain from generating the noise value (e.g., zn of FIG. 6A) associated with a first layer among the plurality of layers of the artificial intelligence model.

According to various embodiments, the electronic device (e.g., the electronic device 101 of FIG. 2) may be provided, wherein the at least one processor (e.g., the processor 250 of FIGS. 3A and 3B, the first processor 250*a*, and the second processor 250*b* of FIG. 3C) is configured to identify, when the event is identified, whether the noise value (e.g., zn of FIG. 6A) for a part of the plurality of layers of the artificial intelligence model is stored in the electronic device (e.g., the electronic device 101 of FIG. 2); compute, based on weight values (e.g., An of FIG. 6A) of the part of the plurality of layers, the data input to the part of the plurality of layers, in the trusted execution environment (e.g., the trusted execution environment 320 of FIGS. 3A to 3C) when no noise value (e.g., zn of FIG. 6A) is stored in the electronic device (e.g., the electronic device 101 of FIG. 2); and compute, based on the weight values (e.g., An of FIG. 6A) of the part of the plurality of layers to which the noise value (e.g., zn of FIG. 6A) is applied, the data input to the part of the plurality of layers, in the rich execution environment (e.g., the rich execution environment 310 of FIGS. 3A to 3C) when the noise value (e.g., zn of FIG. 6A) is stored in the electronic device (e.g., the electronic device 101 of FIG. 2).

According to various embodiments, an operation method of an electronic device (e.g., the electronic device 101 of FIG. 2) may be provided, the method including by applying a noise value (e.g., zn of FIG. 6A) to weight values (e.g., An of FIG. 6A) of at least a part of a plurality of layers included in an artificial intelligence model stored in the electronic device (e.g., the electronic device 101 of FIG. 2); obtaining the weight values (e.g., An' of FIG. 6A) to which the noise value (e.g., zn of FIG. 6A) is applied, when an event for executing the artificial intelligence model is identified; obtaining, based on computation of data input to the at least a part of the plurality of layers, computation data (e.g., Yn' of FIG. 7) by using the weight values (e.g., An' of FIG. 6A) to which the noise value (e.g., zn of FIG. 6A) is applied; and obtaining output data (e.g., Yn of FIG. 6A), based on the acquired computation data (e.g., Yn' of FIG. 7) and the obtained noise value (e.g., zn of FIG. 6A).

According to various embodiments, the operation method may be provided, wherein at least one processor (e.g., the processor 250 of FIGS. 3A and 3B, the first processor 250*a*, and the second processor 250*b* of FIG. 3C) is configured to perform an operation based on a plurality of execution environments, and the plurality of execution environments include the rich execution environment (e.g., the rich execution environment 310 of FIGS. 3A to 3C) and the trusted execution environment (e.g., the trusted execution environment 320 of FIGS. 3A to 3C), and the operation method may further include generating the noise value (e.g., zn of FIG. 6A) and applying the noise value (e.g., zn of FIG. 6A) to the weight values (e.g., An of FIG. 6A) of the at least a part of the plurality of layers, in a trusted execution environment (e.g., the trusted execution environment 320 of FIGS. 3A to 3C); computing the data input to the at least a part of the plurality of layers, by using the weight values (e.g., An' of FIG. 6A) to which the noise value (e.g., zn of FIG. 6A) is applied, in a rich execution environment (e.g., the rich execution environment 310 of FIGS. 3A to 3C) when the event is identified; and obtaining, based on the obtained computation data (e.g., Yn' of FIG. 7) and the applied noise value (e.g., zn of FIG. 6A), the output data (e.g., Yn of FIG. 7) in the trusted execution environment (e.g., the trusted execution environment 320 of FIGS. 3A to 3C) for a third time interval.

According to various embodiments, the operation method may be provided, wherein a first part of the memory (e.g., the memory 230 of FIG. 2) is assigned to the rich execution environment (e.g., the rich execution environment 310 of FIGS. 3A to 3C), and a second part of the memory (e.g., the memory 230 of FIG. 2) is assigned to the trusted execution environment (e.g., the trusted execution environment 320 of FIGS. 3A to 3C), and the method may include storing, in the trusted execution environment (e.g., the trusted environment 320 of FIGS. 3A to 3C), the weight values (e.g., An' of FIG. 6A) to which the noise value (e.g., zn of FIG. 6A) is applied, in a first part of the memory (e.g., the memory 230 of FIG. 2), the first part being assigned to the rich execution environment (e.g., the rich execution environment 310 of FIGS. 3A to 3C); and obtaining the weight values (e.g., An' of FIG. 6A) to which the noise value (e.g., zn of FIG. 6A) is applied, in the rich execution environment (e.g., the rich execution environment 310 of FIGS. 3A to 3C).

According to various embodiments, the operation method may be provided, wherein the noise value (e.g., zn of FIG. 6A) is configured to be selected from among values within a designated range, and the values within the designated range includes values smaller than 0.9 or values equal to or larger than 1.1.

According to various embodiments, an electronic device (e.g., the electronic device 101 of FIG. 2) may be provided, the electronic device (e.g., the electronic device 101 of FIG. 2) including a memory (e.g., the memory 230 of FIG. 2) and at least one processor (e.g., the processor 250 of FIGS. 3A and 3B, the first processor 250*a*, and the second processor 250*b* of FIG. 3C), wherein the at least one processor (e.g., the processor 250 of FIGS. 3A and 3B, the first processor 250*a*, and the second processor 250*b* of FIG. 3C) is configured to, by applying a noise value (e.g., zn of FIG. 6A) to weight values (e.g., An of FIG. 6A) of at least a part of a plurality of layers included in an artificial intelligence model stored in the electronic device (e.g., the electronic device 101 of FIG. 2), obtain the weight values (e.g., An' of FIG. 6A) to which the noise value (e.g., zn of FIG. 6A) is applied, in a trusted execution environment (e.g., the trusted execution environment 320 of FIGS. 3A to 3C); obtain, based on computation of data input to the at least a part of the plurality of layers, computation data (e.g., Yn' of FIG. 7) by using the weight values (e.g., An' of FIG. 6A) to which the noise value (e.g., zn of FIG. 6A) is applied, in a rich execution environment (e.g., the rich execution environment 310 of FIGS. 3A to 3C) when an event for executing the artificial intelligence model is identified; change, based on the obtaining of the computation data (e.g., Yn' of FIG. 7), a state of the electronic device (e.g., the electronic device 101 of FIG. 2) from the rich execution environment (e.g., the rich execution environment 310 of FIGS. 3A to 3C) to the trusted execution environment (e.g., the trusted execution environment 320 of FIGS. 3A to 3C); and obtain, based on the obtained computation data (e.g., Yn' of FIG. 7) and the applied noise value (e.g., zn of FIG. 6A), output data (e.g., Yn of FIG. 7) in the trusted execution environment (e.g., the trusted execution environment 320 of FIGS. 3A to 3C).

What is claimed is:

1. An electronic device comprising:

a memory storing instructions; and at least one processor, wherein the at least one processor is configured to perform an operation based on a plurality of execution environments, the plurality of execution environments comprising a rich execution environment and a trusted execution environment, and the instructions which, when executed by the at least one processor, cause the electronic device to:

by applying a noise value to weight values of at least a part of a plurality of layers included in an artificial intelligence model stored in the electronic device in the trusted execution environment, obtain the weight values to which the noise value is applied, and when an event for executing the artificial intelligence model is identified, obtain computation data by computing, in the rich execution environment, data input to the at least a part of the plurality of layers, by using the weight values to which the noise value is applied, and obtain output data, based on the obtained computation data and the applied noise value, in the trusted execution environment, wherein a first part of the memory is assigned to the rich execution environment and a second part of the memory is assigned to the trusted execution environment, wherein the artificial intelligence model is stored in the second part of the memory and the second part is not accessible to the at least one processor in the rich execution environment, and wherein the first part of the memory is accessible to the at least one processor in the rich execution environment and in the trusted execution environment.

2. The electronic device of claim 1, wherein the instructions which, when executed by the at least one processor, cause the electronic device to:

generate, in the trusted execution environment, the noise value.

3. The electronic device of claim 1, wherein the instructions which, when executed by the at least one processor, cause the electronic device to:

store, in the trusted execution environment, the weight values to which the noise value is applied, in the first part of the memory; and obtain, in the rich execution environment, the weight values to which the noise value is applied by accessing the first part of the memory.

4. The electronic device of claim 3, wherein the instructions which, when executed by the at least one processor, cause the electronic device to:

select the noise value from among values within a designated range, and the values within the designated range comprise values smaller than 0.9 or values equal to or larger than 1.1.

5. The electronic device of claim 1, further comprising a plurality of computation devices for performing computation based on the artificial intelligence model, wherein the plurality of computation devices are assigned to the rich execution environment among the plurality of execution environments, wherein the instructions which, when executed by the at least one processor, cause the electronic device to:

compute, in the rich execution environment by using the plurality of computation devices, the data input to the at least a part of the plurality of layers, based on the weight values to which the noise value is applied.

6. The electronic device of claim 1, wherein the instructions which, when executed by the at least one processor, cause the electronic device to:

generate, in the trusted execution environment, first noise values corresponding to input data to be input to the at least a part of the plurality of layers.

7. The electronic device of claim 6, wherein the instructions which, when executed by the at least one processor, cause the electronic device to:

generate each of the first noise values, by randomly selecting a value from a range of values of the input data.

8. The electronic device of claim 6, wherein the instructions which, when executed by the at least one processor, cause the electronic device to:

when the event for executing the artificial intelligence model is identified, by applying the first noise values to the data input to the at least a part of the plurality of layers in the trusted execution environment, obtain the data to which the first noise values are applied, and change, based on the obtaining of the data to which the first noise values are applied, an execution environment of the electronic device from the trusted execution environment to the rich execution environment.

9. The electronic device of claim 8, wherein the instructions which, when executed by the at least one processor, cause the electronic device to:

compute, in the rich execution environment, based on the weight values to which the noise value is applied, the data to which the first noise values are applied.

10. The electronic device of claim 6, wherein the instructions which, when executed by the at least one processor, cause the electronic device to:

generate, based on the weight values of the at least a part of the plurality of layers of the artificial intelligence model, the first noise values, and a bias, first values in the trusted execution environment, and pre-store the generated first values in a part of the memory.

11. The electronic device of claim 10, wherein the instructions which, when executed by the at least one processor, cause the electronic device to:

obtain the output data, based on computation of the pre-stored first values and the computation data obtained in the rich execution environment.

12. The electronic device of claim 1, wherein the instructions which, when executed by the at least one processor, cause the electronic device to:

identify a state of the electronic device, and generate the noise value in the trusted execution environment when the state of the electronic device corresponds to an idle state.

13. The electronic device of claim 12, wherein the instructions which, when executed by the at least one processor, cause the electronic device to:

identify a number of layers for which the noise value is generated, among the plurality of layers of the artificial intelligence model;

select, based on the identified number of layers being smaller than a preset value, a partial layer from among layers for which no noise value is generated; and generate the noise value associated with the selected partial layer.

14. The electronic device of claim 13, wherein the instructions which, when executed by the at least one processor, cause the electronic device to:

refrain from generating the noise value associated with a first layer among the plurality of layers of the artificial intelligence model.

15. The electronic device of claim 1, wherein the instructions which, when executed by the at least one processor, cause the electronic device to:

when the event is identified, identify whether the noise value for the at least a part of the plurality of layers of the artificial intelligence model is stored in the electronic device, compute, based on the weight values of the at least a part of the plurality of layers, the data input to the part of the plurality of layers, in the trusted execution environment when no noise value is stored in the electronic device, and compute, based on the weight values of the at least a part of the plurality of layers to which the noise value is applied, the data input to the part of the plurality of layers, in the rich execution environment when the noise value is stored in the electronic device.

16. An operation method of an electronic device comprising a memory and at least one processor, the at least one processor being configured to perform an operation based on a plurality of execution environments, the plurality of execution environments comprising a rich execution environment and a trusted execution environment, the method comprising:

by applying a noise value to weight values of at least a part of a plurality of layers included in an artificial intelligence model stored in the electronic device, obtaining the weight values to which the noise value is applied in the trusted execution environment; and when an event for executing the artificial intelligence model is identified, obtaining computation data by computing, in the rich execution environment, data input to the at least a part of the plurality of layers, by using the weight values to which the noise value is applied; and obtaining output data, based on the obtained computation data and the applied noise value, in the trusted execution environment, wherein a first part of the memory is assigned to the rich execution environment, and a second part of the memory is assigned to the trusted execution environment, wherein the artificial intelligence model is stored in the second part of the memory and the second part is not accessible to the at least one processor in the rich execution environment, and wherein the first part of the memory is accessible to the at least one processor in the rich execution environment and in the trusted execution environment.

17. The method of claim 16, further comprising:

generating, in the trusted execution environment, the noise value.

18. The method of claim 17, further comprising:

storing, in the trusted execution environment, the weight values to which the noise value is applied, in the first part of the memory; and obtaining the weight values to which the noise value is applied by accessing the first part of the memory, in the rich execution environment.

19. The method of claim 18, wherein the noise value is configured to be selected from among values within a designated range, and wherein the values within the designated range comprise values smaller than 0.9 or values equal to or larger than 1.1.

20. A non-transitory storage medium storing computer-readable instructions which, when executed by at least one processor of an electronic device, cause the electronic device to perform operations, the operations comprising:

by applying a noise value to weight values of at least a part of a plurality of layers included in an artificial intelligence model stored in the electronic device, obtaining the weight values to which the noise value is applied in a trusted execution environment; and when an event for executing the artificial intelligence model is identified, obtaining computation data by computing, in a rich execution environment, data input to the at least a part of the plurality of layers, by using the weight values to which the noise value is applied; and obtaining output data, based on the obtained computation data and the applied noise value, in the trusted execution environment, wherein a first part of a memory is assigned to the rich execution environment and a second part of the memory is assigned to the trusted execution environment, wherein the artificial intelligence model is stored in the second part of the memory and the second part is not accessible to the at least one processor in the rich execution environment, and wherein the first part of the memory is accessible to the at least one processor in the rich execution environment and in the trusted execution environment.

* * * * *